United States Patent
Lai et al.

(10) Patent No.: US 11,776,036 B2
(45) Date of Patent: Oct. 3, 2023

(54) GENERATING AND UTILIZING CLASSIFICATION AND QUERY-SPECIFIC MODELS TO GENERATE DIGITAL RESPONSES TO QUERIES FROM CLIENT DEVICE

(71) Applicant: Adobe Inc., San Jose, CA (US)

(72) Inventors: Tuan Manh Lai, San Jose, CA (US); Trung Bui, San Jose, CA (US); Sheng Li, San Jose, CA (US); Quan Hung Tran, Melbourne (AU); Hung Bui, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 712 days.

(21) Appl. No.: 15/957,556

(22) Filed: Apr. 19, 2018

(65) Prior Publication Data

US 2019/0325068 A1    Oct. 24, 2019

(51) Int. Cl.
  *G06Q 30/0601*    (2023.01)
  *G06N 3/08*    (2023.01)
  (Continued)

(52) U.S. Cl.
  CPC ....... *G06Q 30/0631* (2013.01); *G06F 16/583* (2019.01); *G06F 16/951* (2019.01); *G06N 3/08* (2013.01); *G06V 10/764* (2022.01)

(58) Field of Classification Search
  None
  See application file for complete search history.

(56) References Cited

U.S. PATENT DOCUMENTS 6,189,002 B1 *   2/2001   Roitblat .................. G06F 16/30
8,478,052 B1 *   7/2013   Yee ..................... G06F 16/5846
                                                           382/224

(Continued)

OTHER PUBLICATIONS

Weijie Bian, Si Li, Zhao Yang, Guang Chen, and Zhiqing Lin. 2017. A compare-aggregate model with dynamic-clip attention for answer selection. In Proceedings of the 2017 ACM on Conference on Information and Knowledge Management, CIKM '17, pp. 1987-1990, New York, NY, USA. ACM.

(Continued)

*Primary Examiner* — Uyen T Le
(74) *Attorney, Agent, or Firm* — Keller Preece PLLC

(57) ABSTRACT

The present description relates to systems, methods, and non-transitory computer readable media for generating digital responses to digital queries by utilizing a classification model and query-specific analysis models. For example, the described systems can train a classification model to generate query classifications corresponding to product queries, conversational queries, and/or recommendation/purchase queries. Moreover, the described systems can apply the classification model to select pertinent models for particular queries. For example, upon classifying a product query, the described systems can utilize a neural ranking model (trained based on a set of training product specifications and training queries) to generate relevance scores for product specifications associated with a digital query. The described systems can further compare generated relevance scores to select a product specification and generate a digital response that includes the pertinent product specification to provide for display to a client device.

7 Claims, 16 Drawing Sheets

(51) Int. Cl.
*G06F 16/951* (2019.01)
*G06F 16/583* (2019.01)
*G06V 10/764* (2022.01)

(56) References Cited

U.S. PATENT DOCUMENTS

| | | | | |
|---|---|---|---|---|
| 8,560,539 | B1* | 10/2013 | Engebretsen | G06F 16/355 707/736 |
| 9,418,375 | B1* | 8/2016 | Cunico | G06F 40/279 |
| 10,013,640 | B1* | 7/2018 | Angelova | G06N 3/0454 |
| 2010/0082613 | A1* | 4/2010 | Liu | G06F 16/334 707/726 |
| 2015/0227972 | A1* | 8/2015 | Tang | G06Q 30/0255 705/14.53 |
| 2017/0061330 | A1* | 3/2017 | Kurata | G06F 16/355 |
| 2017/0132512 | A1* | 5/2017 | Loffe | G06N 3/08 |
| 2017/0351951 | A1* | 12/2017 | Santos | G06N 3/08 |
| 2018/0189857 | A1* | 7/2018 | Wu | G06N 20/00 |
| 2018/0240013 | A1* | 8/2018 | Strope | G06N 3/045 |
| 2018/0302682 | A1* | 10/2018 | Saxena | G06Q 50/01 |
| 2018/0349359 | A1* | 12/2018 | McCann | G06N 3/08 |
| 2018/0357569 | A1* | 12/2018 | Vadlamani | G06N 20/00 |
| 2019/0138616 | A1* | 5/2019 | Parameshwara | G06F 16/3347 |
| 2020/0082928 | A1* | 3/2020 | Wu | G16H 10/60 |

OTHER PUBLICATIONS

Jane Bromley, Isabelle Guyon, Yann LeCun, Eduard Sackinger, and Roopak Shah. 1993. Signature verification using a "siamese" time delay neural network. In Proceedings of the 6th International Conference on Neural Information Processing Systems, NIPS'93, pp. 737-744, San Francisco, CA, USA. Morgan Kaufmann Publishers Inc.

Lei Cui, Furu Wei, Shaohan Huang, Chuanqi Tan, Chaoqun Duan, and Ming Zhou. 2017. Superagent: A customer service chatbot for e-commerce websites. In Proceedings of ACL 2017, System Demonstrations, pp. 97-102. Association for Computational Linguistics.

Yoshua Bengio, Aaron C. Courville, and Geoffrey E. Hinton. 2015. Deep learning. Nature, 521 7553:436-44.

Sepp Hochreiter and Jurgen Schmidhuber. 1997. Long short-term memory. Neural computation, 9 8:1735-80.

Tomas Mikolov, Ilya Sutskever, Kai Chen, Greg Corrado, and Jeffrey Dean. 2013. Distributed representations of words and phrases and their compositionality. In Proceedings of the 26th International Conference on Neural Information Processing Systems—vol. 2, NIPS'13, pp. 3111-3119, USA. Curran Associates Inc.

Jeffrey Pennington, Richard Socher, and Christopher D. Manning. 2014. Glove: Global vectors for word representation. In EMNLP.

Jinfeng Rao, Hua He, and Jimmy Lin. 2016. Noise-contrastive estimation for answer selection with deep neural networks. In Proceedings of the 25th ACM International on Conference on Information and Knowledge Management, CIKM '16, pp. 1913-1916, New York, NY, USA. ACM.

Gehui Shen, Yunlun Yang, and Zhi-Hong Deng. 2017. Inter-weighted alignment network for sentence pair modeling. In EMNLP.

Kai Sheng Tai, Richard Socher, and Christopher D. Manning. 2015. Improved semantic representations from tree-structured long short-term memory networks. CoRR, abs/1503.00075.

Mengqiu Wang and Christopher D. Manning. 2010. Probabilistic tree-edit models with structured latent variables for textual entailment and question answering. In Proceedings of the 23rd International Conference on Computational Linguistics, COLING '10, pp. 1164-1172, Stroudsburg, PA, USA. Association for Computational Linguistics.

Mengqiu Wang, Noah A. Smith, and Teruko Mitamura. 2007. What is the jeopardy model? a quasisynchronous grammar for qa. In EMNLP-CONLL.

Shuohang Wang and Jing Jiang. 2016. A compare-aggregate model for matching text sequences. CORR, abs/1611.01747.

Yi Yang, Scott Wen-tau Yih, and Chris Meek. 2015. Wikiqa: A challenge dataset for open-domain question answering. ACL Association for Computational Linguistics.

Xuchen Yao, Benjamin Van Durme, Chris Callisonburch, and Peter Clark. 2013. Answer extraction as sequence tagging with tree edit distance. In In North American Chapter of the Association for Computational Linguistics (NAACL).

Scott Wen-tau Yih, Ming-Wei Chang, Chris Meek, and Andrzej Pastusiak. 2013. Question answering using enhanced lexical semantic models. ACL Association for Computational Linguistics.

Lei Yu, Karl Moritz Hermann, Phil Blunsom, and Stephen G. Pulman. 2014. Deep learning for answer sentence selection. CoRR, abs/1412.1632.

Radu Florian Zhiguo Wang, Wael Hamza. 2017. Bilateral multi-perspective matching for natural language sentences. In Proceedings of the Twenty-Sixth International Joint Conference on Artificial Intelligence, IJCAI-17, pp. 4144-4150.

P. Haffner, G. Tur, and J. H. Wright. 2003. Optimizing svms for complex call classification. In Acoustics, Speech, and Signal Processing, 2003. Proceedings. (ICASSP '03). 2003 IEEE International Conference on, vol. 1, pp. I-632-I-635 vol. 1.

Minh-Thang Luong, Hieu Pham, and Christopher D. Manning. 2015. Effective approaches to attention-based neural machine translation. CoRR, abs/1508.04025.

R. Sarikaya, G. E. Hinton, and B. Ramabhadran. 2011. Deep belief nets for natural language call-routing. In 2011 IEEE International Conference on Acoustics, Speech and Signal Processing (ICASSP), pp. 5680-5683.

Ilya Sutskever, Oriol Vinyals, and Quoc V. Le. 2014. Sequence to sequence learning with neural networks. In NIPS.

* cited by examiner

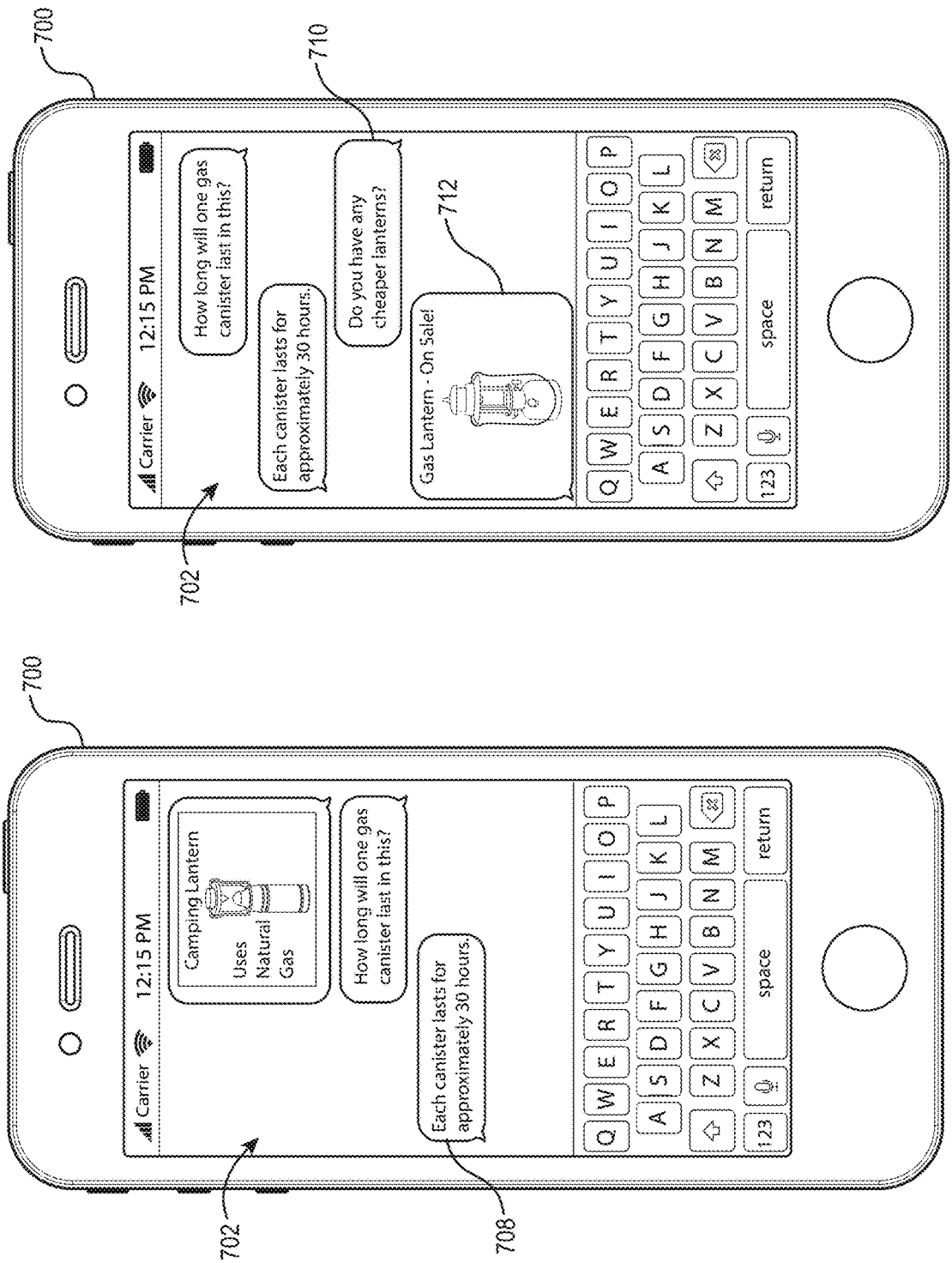

| Model | Top-1 Accuracy | Top-2 Accuracy | Top-3 Accuracy |
|---|---|---|---|
| Unigram | 80.40% | 89.20% | 92.40% |
| IWAN | 85.60% | 95.80% | 91.60% |
| Our Model | 85.20% | 96.20% | 98.00% |

Fig. 9

GENERATING AND UTILIZING CLASSIFICATION AND QUERY-SPECIFIC MODELS TO GENERATE DIGITAL RESPONSES TO QUERIES FROM CLIENT DEVICE

BACKGROUND

Advancements in artificial intelligence technology and natural language processing have led to a variety of innovations in providing automated responses to digital questions from client devices of individual users. For example, automated chat systems are now able to analyze a digital question from a client device of a user to identify content cues that the systems use to generate an automated digital message in response to the digital question from the user.

Despite these advances however, conventional automated chat systems continue to suffer from a number of disadvantages, particularly in the accuracy, efficiency, and flexibility of generating responses to queries from individual client devices. For example, conventional chat systems often have difficulty generating and providing appropriate responses to a variety of different digital questions regarding different topics. To illustrate, some conventional systems may provide an accurately digital response to a digital question regarding a first category but provide an irrelevant digital response to a digital question regarding another category.

Moreover, while conventional automated chat systems can generate an automated message based on receiving a digital message from a client device, these systems often require large amounts of computer memory and other computing resources. Indeed, conventional automated chat systems implement inefficient models, requiring significant memory and processing power. The time and processing power required by these conventional systems is particularly problematic in light of the need to provide responses to user queries across computing systems in real-time (i.e., near instantaneously) and, in many circumstances, on mobile devices.

Moreover, some conventional automated chat systems are slow and inflexible. For example, some conventional systems require large, inefficient models to generate automated messages. Such systems take a significant amount of time to generate messages due to the complexity of underlying models. Furthermore, given the efficiency problems just discussed, some automated chat systems are incapable of application on a mobile device. Such systems thus rigidly require users to access cloud-based computer resources to receive automated responses to queries, thereby limiting system flexibility.

In light of these shortcomings, many conventional systems resort to employing individual, community, or crowd-sourcing solutions. To illustrate, some conventional systems will employ individuals to answer questions from clients regarding particular products or will utilize community question answering-systems where experienced users provide answers voluntarily. Such solutions, however, require significant time and expense. Moreover, such systems require a significant outlay of distributed computing resources and manpower for each responder client device that generates a response.

Thus, there are several disadvantages with regard to conventional automated chat systems.

SUMMARY

One or more embodiments described herein provide benefits and solve one or more of the foregoing or other problems in the art by providing systems, methods, and non-transitory computer readable media that utilize computer vision, speech processing techniques, classification models, and various language processing models to intelligently generate digital responses to client devices. For example, the disclosed systems can utilize computer vision and language processing to identify digital queries from client devices. The disclosed systems can then utilize a classification model and query-specific analysis models to quickly and efficiently generate digital responses. For instance, the disclosed systems can utilize a query classification model to analyze received queries and determine an intent or topic corresponding to the query (e.g., a product-specific query, a conversational query, and/or a recommendation/purchase query). Based on the classification, the disclosed systems can then utilize unique models to generate digital responses. For instance, based on determining that a received query is a product query, the disclose systems can utilize a trained neural ranking model to identify pertinent product specifications appropriate to the query and generate a digital response. Similarly, based on determining that a received query is a conversational query or a recommendation query the disclosed systems utilize one or more alternative models to generate a response. In this manner, the disclosed systems can provide an end-to-end intelligent digital assistant that efficiently and flexibly provides accurate digital responses to digital queries.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIGS. 7A-7E illustrate an example client device displaying user interfaces including queries and responses in accordance with one or more embodiments;

FIG. 9 illustrates test results regarding accuracy of the digital response generation system as compared to conventional systems in accordance with one or more embodiments;

DETAILED DESCRIPTION

Figure 1:
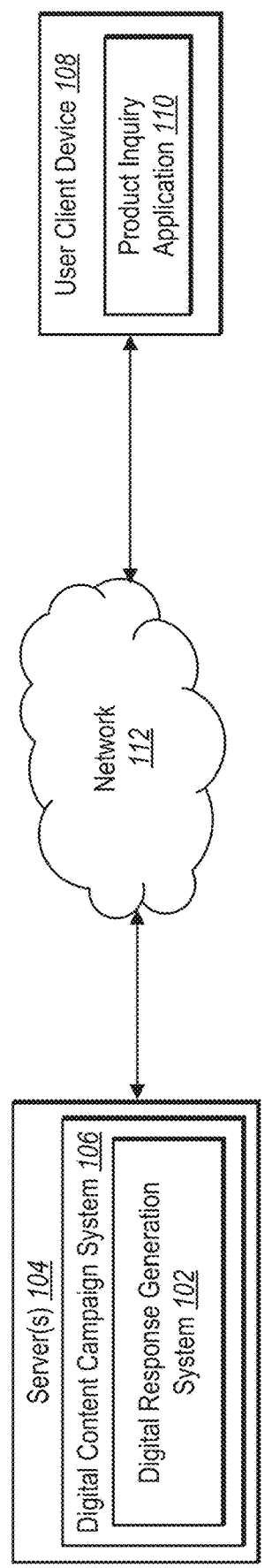
FIG. 1 illustrates an example environment for implementing a digital response generation system in accordance with one or more embodiments.

One or more embodiments described herein provide benefits and solve one or more of the foregoing or other problems in the art with a digital response generation system that utilizes computer vision techniques, speech processing techniques, classification models, and query-specific language processing models to generate digital response to digital queries from client devices. For instance, in one or more embodiments, the digital response generation system utilizes computer vision techniques to identify an item corresponding to a digital query from a client device. The digital response generation system can utilize a query classification model to determine a classification (e.g., an intent or topic) corresponding to the digital query and, based on the classification, select a model for generating a digital response. For example, based on determining that a digital query is a product query (e.g., a digital query asking about a particular product), the digital response generation system can utilize a neural ranking model to select a product specification to include in a digital response. Similarly, based on determining that a digital query is a conversational query, a recommendation query/purchase query, the digital response generation system can utilize alternative models to generate and provide a digital response to a digital query.

To illustrate, in one or more embodiments in response to receiving a query from a client device. The digital response generation system can utilize a query classification model to classify the query as a product query, a conversational query, a recommendation query, or a purchase query. For instance, based on classifying the query as a product query, the digital response generation system can determine a plurality of product specifications associated with a product identified from the query. In addition, the digital response generation system can utilize a neural ranking model to generate a relevance score for each of the plurality of product specifications with respect to the received query. In one or more embodiments, the digital response generation system selects, from among the plurality of product specifications, a product specification corresponding to the received query by comparing each relevance score for each product specification (e.g., to identify a product specification with a highest relevance score). Furthermore, the digital response generation system can generate a response to the received query that indicates the product specification corresponding to the received query.

As just mentioned, in one or more embodiments, the digital response generation system can receive a query from a client device. For example, the digital response generation system can receive a query in the form of speech, text, and/or digital images from a client device. As mentioned, the digital response generation system can utilize computer vision techniques to analyze digital images from the client device to identify an item, product, or object corresponding to a digital query. Similarly, the digital response generation system can utilize natural language processing techniques and speech processing techniques to analyze text or speech in the digital query.

Furthermore, in response to receiving the query, the digital response generation system utilizes a query classification model to generate a query classification. Indeed, as mentioned above, the digital response generation system can classify the query as one of a product query, a conversational query, a recommendation query, or a purchase query. Classifying the digital query allows the digital response generation system to apply query-specific models uniquely suited to generate accurate digital responses corresponding to a particular query classification.

For example, in response to receiving a digital query (e.g., "How are you doing?"), the digital response generation system can apply query classification model and classify the query as a conversational query. Based on classifying the digital query as a conversational query, the digital response generation system can select and apply a conversational model to generate response to the conversational query. To illustrate, the digital response generation system can apply a conversational model to the digital query to generate a conversational digital response, such as, "I'm fine, thanks for asking!"

Similarly, the digital response generation system can receive a query that indicates a request for a product recommendation and/or information about purchasing a particular product. For example, the digital response generation system can receive a digital query (e.g., "Can you recommend a different brand of this product?") and classify the digital query as a recommendation/purchase query. Based on classifying the digital query as a recommendation/purchase query the digital response generation system can select and apply a recommendation and purchase model to generate a response to the query (e.g., a digital image and/or link to a similar product of a different brand).

As mentioned, the digital response generation system can also utilize the query classification model to classify a product query. To illustrate, the digital response generation system can receive a digital image of a particular product (e.g., a lightbulb, office chair, etc.) along with a query that corresponds to the depicted product (e.g., "How long will this bulb last?"). The digital response generation system can apply the query classification model and determine that the digital query is a product query.

As discussed above, in response to identifying a product query, the digital response generation system can determine a plurality of product specifications associated with the product. To illustrate, the digital response generation system can identify the product associated with the received query (e.g., via language processing or digital image analysis techniques) to locate product identifiers by which to identify the product. Upon identifying the product, the digital response generation system can access a product database to retrieve product specifications pertaining to the product.

Moreover, in response to identifying a product query, the digital response generation system can apply a neural ranking model to generate a digital response that includes one or more product specifications. To illustrate, the digital response generation system can utilize a neural ranking model that is trained based on training queries and training product specifications to determine relevance scores in relation to queries and product specifications. The digital response generation system can utilize the neural ranking model to generate relevance scores in relation to each product specification and the digital query. By comparing these relevance scores, the digital response generation system can select a product specification and generate a digital response that includes the product specification (e.g., "this light bulb lasts approximately 25,000 hours.").

As mentioned, the neural ranking model can include different layers that the digital response generation system uses to generate relevance scores and select a product specification that corresponds to a received query. For example, the digital response generation system can utilize a neural ranking model including a word representation layer (e.g., that generates vector representations of the text of digital queries and product specifications), a bidirectional long short-term memory layer (e.g., that generate query vectors and product specification vectors based text vector representations), a differential product concatenation layer (e.g., that generates a concatenated vector based on the query vector and the product specification vector), a full connection layer, and a softmax layer (e.g., that generates a probability that any given product specification is relevant to the received query). Accordingly, the neural ranking model can generate relevance scores for product specifications that the digital response generation system can then utilize to generate a digital response to a product query.

The digital response generation system provides several advantages over conventional automated chat systems. For example, the digital response generation system improves efficiency of computing devices that implement the digital response generation system. For instance, the digital response generation system is less computationally complex than many conventional automated chat systems and requires fewer computer resources such as memory, storage, and processing power. Indeed, whereas some conventional systems require complicated models and time-intensive processes to generate automated responses to electronic messages, the digital response generation system can utilize lightweight classification models and query-specific analysis models to generate digital responses. For example, as affirmatively demonstrated below, the digital response generation system can utilize a neural ranking model that requires less processing power and computer memory than many conventional systems.

The digital response generation system can also improve accuracy over conventional systems. Indeed, by utilizing a classification model to select query-specific models, the digital response generation system can apply accurate models specific to particular query classifications, thus improving accuracy without placing undue burdens on computing resources. Furthermore, the digital response generation system can utilize language analysis models that are more efficient than conventional systems. For example, as affirmatively demonstrated below, digital response system can utilize a neural ranking system that is less burdensome than conventional systems while still producing accurate results.

In addition, the digital response generation system also improves flexibility and robustness over conventional systems. For instance, the digital response generation system can be implemented in a less computationally expensive manner, thereby enabling its use on mobile devices. Furthermore, the digital response generation system is capable of accurately responding to a variety of query types. Moreover, the digital response generation system avoids the time, expense, and inefficiency of conventional individual, community, or crowd-sourcing solutions.

As illustrated by the foregoing discussion, the present disclosure utilizes a variety of terms to describe features and benefits of the digital response generation system. Additional detail is now provided regarding the meaning of these terms as used in this disclosure. For example, as used herein, the term "digital query" (or "query") refers to one or more digital messages from a client device. In particular, a query can refer to speech, text, a digital image, or some other form of electronic message that includes a question or prompt. A query can refer to a "product query" that indicates a question about a particular product, a "conversational query" that indicates a conversational question not necessarily about a particular product, a "recommendation query" that indicates a request for a product recommendation, or a "purchase query" that indicates a request for purchasing a product.

As mentioned, the digital response generation system can receive a query from a client device and can classify the query using a query classification model. As used herein, the term "query classification model" refers to a machine learning model that categorizes or classifies a query. For example, a query classification model can classify a digital query as a product query, a conversational query, a recommendation query, and/or a purchase query. In addition, a query classification model can refer to one or more neural networks or other machine learning model techniques such as random forests trained to classify query text.

The digital response generation system can utilize different language processing models to analyze a digital query based on a query classification. As used herein, the term "language processing model" refers to a computer model for analyzing input text (e.g., a digital query) in generating a digital response. A language processing model includes a conversational model, a recommendation/purchase model, or a neural ranking model.

For example, based on classifying a query as a conversational query, the digital response generation system can utilize a conversational model to generate a response to the query. As used herein, the term "conversational model" refers to a machine learning model trained to generate responses based on conversational text (e.g., a conversational query and response). For example, a conversational model can include an encoder to convert input text into a vector representation and a decoder to generate an output response text based on the vector representation of the input text. Also, as described in further detail below, the encoder and/or decoder of the conversational model can include one or more bidirectional long short-term memory layers, and the conversational model can further include a global attention mechanism to enable the decoder to attend to specific parts of the input conversational text. In one or more embodiments, the conversational model is a separate model from a neural ranking model and/or a recommendation/purchase model. For example, the conversational model can include a model with similar architecture to a neural ranking model trained utilizing conversational messages rather than product messages.

In addition, based on classifying a query as a recommendation query or a purchase query, the digital response generation system can utilize a recommendation/purchase model to generate a response to the query. As used herein, the term "recommendation/purchase model" (also referred to interchangeably as "recommendation or purchase model" and "recommendation and purchase model") refers to a machine learning model whereby the digital response generation system generates a response to a query related to product recommendations and/or purchases. For example, a recommendation and purchase model can refer to one or more neural networks or other machine learning techniques similar to those described with reference to the conversational model.

As used herein, the term "product" refers to goods or services (e.g., goods or services about which a user may ask a question). In particular, a product can refer to an item or object or can refer to an action, activity, or event. For example, a product can refer to goods or services at a particular store that are available for purchase. Examples of products include, but are not limited to, hardware items, food items, office supplies, building supplies, electronics, sporting equipment, etc. The term "product" can also be utilized herein to refer to a mathematical or algorithmic operation. For example, the term "product" can refer to a computer operation for determining element-wise multiplication of vectors within a neural ranking model.

As mentioned, the digital response generation system determines product specifications for a particular product based on receiving a query about a product (e.g., a product query) from a client device. As used herein, the term "product specification" refers to information associated with a product. In particular, a product specification can refer to a trait, feature, attribute, or characteristic of a particular product. For example, a product specification can refer to a weight, height, width, duration, energy rating, number of calories, voltage rating, durability, estimated lifetime, or some other attribute of a product.

As mentioned, the digital response generation system utilizes a neural ranking model to select a product specification of a particular product and that corresponds to a received query. As used herein, the term "neural ranking model" refers to a machine learning model that includes a plurality of layers for analyzing a query and for analyzing product specifications. In particular, a neural ranking model can refer to a neural network such as a recurrent neural network ("RNN"), a deep neural network, a convolutional neural network ("CNN"), long short-term memory network, or a combination thereof. Indeed, a neural ranking model can refer to a machine learning model comprised of constituent models or layers that are neural networks. A neural ranking model can accept an input including a query and one or more product specifications and can produce an output including a relevance score that indicates a relevance between a particular product specification and the query.

Indeed, as used herein, the term "relevance score" refers to a relevance or relationship between a query and a product specification. In particular, a relevance score can refer to a probability that a given product specification corresponds to (e.g., matches) a query. For example, a relevance score can be a percentage that indicates a likelihood that a product specification corresponds to a query (e.g., 80%, 90%, etc.), or a relevance score can be a numerical score within a particular range (e.g., 0 to 1, 0 to 10, etc.) where higher scores indicate a higher probability of matching. In addition, the digital response generation system can rank product specifications based on their respective relevance scores.

As mentioned, the digital response generation system can utilize a neural ranking model that includes a plurality of layers. For example, the neural ranking model can include a word representation layer. As used herein, the term "word representation layer" refers to a layer within the neural ranking model that transforms a query text and/or a product specification text into vector representations. For example, a word representation layer can refer to a word2vec algorithm, a GloVe algorithm, or some other word transformation algorithm or network whereby the digital response generation system can transform the query and/or the product specification into a vector representation. To illustrate, the word representation layer can take as input a text string ("how are you") and output a sequence of text vector vectors (vector for how, vector for are, and vector for you).

The neural ranking model can also include a bidirectional long short-term memory layer. As used herein, the term "bidirectional long short-term memory layer" refers to a layer within a neural ranking model that generates a sequence of context-aware vector representations (e.g., a representation for each position of the sentences produced by the word representation layer). In addition, the bidirectional long short-term memory layer can accept the text vector representations of the received query as input and can output a "query vector" for a received query based on its text vector representation (e.g., as output from the word representation layer). Likewise, the bidirectional long short-term memory layer can accept the text vector representations of a product specification and can output a "product specification vector" for the product specification based on the text vector representations. To generate the query vector and the product specification vector, the bidirectional long short-term memory layer can include a max-pooling operation that is applied to the set of vectors in the output sequence.

In addition, the neural ranking model can include a differential product concatenation layer. As used herein, the term "differential product concatenation layer" refers to a layer within the neural ranking model that generates a "concatenated vector" based on the query vector and the product specification vector. In particular, the digital response generation system can implement a differential product concatenation layer to generate a concatenated vector that includes a differential vector (e.g., a vector that represents a difference between the query vector and the product specification vector) and a product vector (e.g., a vector that represents an element-wise product of the query vector and the product specification vector).

Still further, the neural ranking model can include a full connection layer and a softmax layer. As used herein, the term "full connection layer" refers to a layer of the neural ranking model that can weight features of, for example, a concatenated vector. In particular, the full connection layer can comprise a neural network that analyzes the concatenated vector at different levels of abstraction to generate a probability indication (e.g., a probability that a query corresponds to a product specification). As used herein, the term "softmax layer" refers to a layer of the neural ranking model whereby the digital response generation system can generate an output such as a relevance score for a particular product specification with respect to a received query. Additional detail regarding various layers of a neural ranking model are provided below (e.g., in relation to FIGS. 4-6.

As mentioned, in some embodiments the digital response generation system trains a neural ranking model based on training queries and training product specifications corresponding to a training product. As used herein, the term "train" refers to utilizing information to tune or teach a machine learning model (e.g., a neural ranking model). The term "training" (used as an adjective or descriptor, such as "training query" or "training product specification") refers to information or data utilized to tune or teach a machine learning model (e.g., the neural ranking model).

More detail regarding the digital response generation system will now be provided with reference to the figures. For example, FIG. 1 illustrates a schematic diagram of an example environment for implementing a digital response generation system 102 in accordance with one or more embodiments. An overview of the digital response generation system 102 is described in relation to FIG. 1. Thereafter, a more detailed description of the components and processes of the digital response generation system 102 is provided in relation to the subsequent figures.

As shown in FIG. 1, the environment includes server(s) 104, a client device 108, and a network 112. Each of the components of the environment can communicate via the network 112, and the network 112 may be any suitable network over which computing devices can communicate. Example networks are discussed in more detail below in relation to FIG. 14.

As shown in FIG. 1, the environment includes a client device 108. The client device 108 can be one of a variety of computing devices, including a smartphone, desktop computer, laptop computer, or other computing device as described in relation to FIG. 14. Although FIG. 1 illustrates a single client device 108, in some embodiments the environment can include multiple different client devices. Indeed, the digital response generation system 102 can receive queries from one or more client devices.

As illustrated in FIG. 1, the environment includes the server(s) 104. The server(s) 104 may generate, store, receive, and transmit any type of electronic data, such as electronic messages, digital images, metadata, etc. For example, the server(s) 104 may receive data from the client device 108 in the form of a digital query indicating a particular product. In addition, the server(s) can transmit data to the client device 108 to provide a response to the received query, as mentioned above. For example, the server(s) 104 can communicate with the client device 108 via the network 112. In some embodiments, the server(s) 104 comprises a content server. The server(s) 104 can also comprise a communication server, a web-hosting server, a social networking server, or a digital content campaign server.

As shown in FIG. 1, the server(s) 104 also include the digital response generation system 102 as part of a digital content campaign system 106. The digital content campaign system 106 can communicate with the client device 108 to provide digital content such as product information (e.g., specifications) that corresponds to a product indicated in a received query, information relating to products similar to a product indicated in a received query, a response to a query, or some other type of information.

Although FIG. 1 depicts the digital response generation system 102 located on the server(s) 104, in some embodiments, the digital response generation system 102 may be implemented by (e.g., located entirely or in part) on one or more other components of the environment. For example, as mentioned above, the digital response generation system 102 may be implemented by the client device 108.

Moreover, in one or more embodiments, the digital response generation system 102 is implemented on a third-party server. For example, in such embodiments, the server(s) 104 may be associated with a digital content publisher and a third-party server can host the digital response generation system 102. Specifically, the third-party server can receive event information regarding a user, provide identification information for the user from the third-party server to the digital content publisher by way of the server(s) 104, and the server(s) 104 can select and provide digital content for display to a client device (e.g., the client device 114a) of the user.

As mentioned, the digital response generation system 102 may provide digital responses to the client device 108. Indeed, the digital response generation system 102 can distribute (e.g., via the network 112) digital responses to the client device 108, including digital images, text, and/or audio responses. For example, the digital response generation system 102 can generate and/or provide digital responses customized for specific users based on analyzing received queries. Thus, the digital response generation system 102 can provide responses to answer any questions indicated by the received queries.

As illustrated in FIG. 1, the client device 108 includes a product inquiry application 110. The product inquiry application 110 may be a web application or a native application installed on the client device 108 (e.g., a mobile application, a desktop application, etc.). The product inquiry application 110 can interface with the digital response generation system 102 to provide query information to the server(s) 104, and to present (e.g., display) digital responses received from the server(s) 104. Indeed, the product inquiry application 110 can receive data from the digital response generation system 102 and present, for display, a user interface as part of a webpage, a social networking feed, or an application interface that includes a response to a query.

In some embodiments, though not illustrated in FIG. 1, the environment may have a different arrangement of components and/or may have a different number or set of components altogether. For example, the client device 108 may communicate directly with the digital response generation system 102, bypassing the network 112. Additionally, a product database may be housed within the client device 108 and/or the server(s) 104, along with a query classification model, a neural ranking model, a conversational model, and/or a recommendation and purchase model. Further, the digital response generation system 102 can be implemented in a variety of different ways across the server(s) 104, the network 112, and the client device 108.

Figure 2:
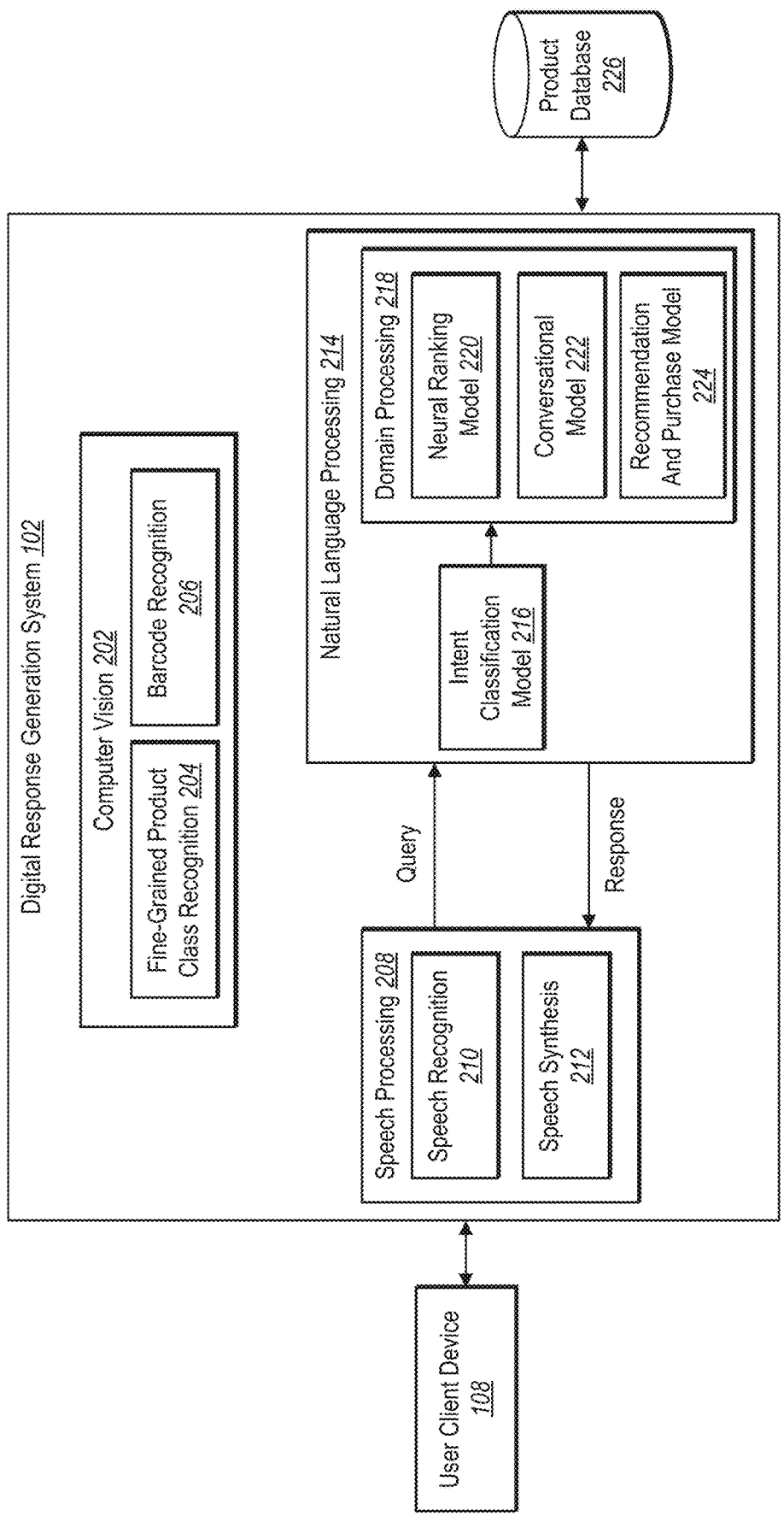
FIG. 2 illustrates components of the digital response generation system in accordance with one or more embodiments

As mentioned, in one or more embodiments, the digital response generation system 102 receives a query from a client device 108 and, based on the query, generates and provides a response. Indeed, FIG. 2 illustrates generating a response to a received query by using one or more of a neural ranking model 220, a conversational model 222, or a recommendation and purchase model 224. As shown, the digital response generation system 102 receives a query from a client device 108. In some cases, the digital response generation system 102 receives a query in the form of digital text, while in other cases the digital response generation system 102 receives a query that includes a digital image and/or audible speech.

For example, based on receiving a query that includes a digital image, the digital response generation system 102 utilizes a computer vision technique 202 to analyze the digital image. In particular, the digital response generation system 102 can implement fine-grained product class recognition 204 to identify any products depicted within the digital image and to retrieve the necessary information from a product database 226 to determine the product identification as well as product specifications. For example, the digital response generation system 102 can utilize a classification model such as a neural network (e.g., a convolutional neural network trained on various products and ground truth classifications), a random forest algorithm, or a support vector machine trained to generate a product class and/or product identification for a given product. Indeed, the digital response generation system 102 can determine classes such as chairs, lamps, lightbulbs, tables, wrenches, computer monitors, or any other type of product.

To enhance the accuracy of correctly identifying a product within a digital image, the digital response generation system 102 can also utilize one or more barcode recognition algorithms 206 to identify a product by scanning and analyzing a barcode (or QR code) within the digital image. For example, the digital response generation system 102 can implement a scan-line analysis, an image tessellation algorithm, and/or a neural network. Indeed, the digital response generation system 102 can analyze a digital image and utilize a neural network to determine areas within the digital image that have a high probability of containing a bar code, and the digital response generation system 102 can further analyze the bar code using, for example, a scan line technique to determine a product identification number based on the bar code. In some embodiments, the digital response generation system 102 can utilize a third-party barcode recognition algorithm by implementing a particular third-party API.

In addition, the digital response generation system 102 can receive a query that includes audible speech. Based on receiving a spoken/verbal query, the digital response generation system 102 utilizes a speech processing technique 208 to generate a digital text version of the spoken query. For example, the digital response generation system 102 implements speech recognition 210 to convert the audible words of the spoken query into digital text. For example, the digital response generation system 102 can utilize a hidden Markov model or a neural network to perform speech recognition by, for instance, determining probabilities of particular words based on their context in a sentence. In other embodiments, the digital response generation system 102 can utilize a third-party service by calling on a particular speech processing API to convert a spoken query into digital text. In some embodiments, on the other hand, the digital response generation system 102 receives a query that is already in the form of digital text.

Based on the digital text version of a given query, the digital response generation system 102 utilizes natural language processing 214 to analyze the query and generate a response to the query. To analyze the query, the digital response generation system 102 implements a query classification model 216 to determine an intent associated with the query. For instance, the digital response generation system 102 analyzes the text of the query to determine whether the query is a product query, a conversational query, a recommendation query, and/or a purchase query.

In this way, the digital response generation system 102 classifies the query and determines which of the neural ranking model 220, the conversational model 222, or the recommendation and purchase model 224 to utilize to generate a response to the query. To classify the query by way of the query classification model 216, the digital response generation system 102 can implement one or more random forest algorithms, support vector machines (SVMs), and/or deep neural networks trained to classify queries based on the text of the queries.

For example, in relation to a random forest algorithm, the digital response generation system 102 can train the query classification model 216 based on a dataset of training queries (e.g., 500 queries). Indeed, the digital response generation system 102 can generate a random forest using particular number of the training queries (e.g., ⅔ of the training queries) as training data and utilizing the remainder of the training queries (e.g., ⅓ of the training queries) as a test set.

To train the query classification model 216, the digital response generation system 102 can generate a bag-of-words feature vector for each training query in the training data and use those vectors as input for the random forest algorithm. For example, the digital response generation system 102 represents a query as a "bag" or multiset of its words (disregarding order and/or grammar in some cases). In addition, the digital response generation system 102 trains the random forest algorithm using a bootstrap aggregation (sometimes referred to as "bagging") method. Specifically, the digital response generation system 102 repeatedly generates subsets of training data by selecting random samples (with replacement, meaning samples can be repeated) of the training data (e.g., from the bag of words for a query) with corresponding responses (e.g., a ground truth classification). The digital response generation system 102 further generates decision trees based on the subsets of the training data. The digital response generation system 102 then fits decision trees within the random forest to the selected samples and corresponding responses. The digital response generation system 102 can further set the number of trees for the random forest (e.g., 80 trees, 100 trees, etc.).

In one or more embodiments, in implementing a random forest algorithm the digital response generation system 102 selects a subset of available features. In particular, at each candidate split the digital response generation system 102 selects a random subset of available features (sometimes referred to as "feature bagging"). For each node split during the growing of a tree, the digital response generation system 102 can also utilize a particular number of features for the split. For example, the digital response generation system 102 can set the number of features for a split to be √T, where k is the total number of features of the dataset.

Utilizing a trained random forest algorithm, the digital response generation system 102 can classify a query into various categories. Indeed, after training, predictions for new queries can be generated by averaging predictions from individual regression trees reflecting the training samples. In some embodiments, the digital response generation system 102 trains the query classification model 216 to have an accuracy of 98.20% based on the test data.

As mentioned, in one or more embodiments, the digital response generation system 102 can also utilize a neural network for the query classification model. In such circumstances, the digital response generation system 102 can train the query classification model 216 based on training queries and corresponding classifications for the training queries. To illustrate, the digital response generation system 102 can identify a training query and a corresponding ground truth classification for the training query. The digital response generation system 102 can also utilize the query classification model 216 to generate a predicted classification for the training query and can compare the predicted classification with the ground truth classification (e.g., by using a loss function). In addition, the digital response generation system 102 can back-propagate to adjust parameters to tune the query classification model 216 and to reduce any measure of loss between the ground truth classification and the predicted classification. By repeating the training process using multiple training queries, the digital response generation system 102 trains the query classification model 216 to accurately classify queries where the predicted classification is within a threshold error (e.g., measure of loss) of the ground truth classification.

For example, if the digital response generation system 102 receives a query of "How heavy is this chair," the digital response generation system 102 can classify the query as a product query because the query asks a question about a particular product that relates to product specifications. As another example, if the digital response generation system 102 receives a query of "How are you doing," the digital response generation system 102 can classify the query as a conversational query because the query indicates casual "chit chat" rather than a product-specific question. As yet another example, if the digital response generation system 102 receives a query of "Show me some other items," the digital response generation system 102 can classify the query as a recommendation query because the query indicates a request for information about different products. As still another example, if the digital response generation system 102 receives a query of "I want to buy this," the digital response generation system 102 can classify the query as a purchase query because the query indicates a request to purchase a particular product.

Based on classifying a query, the digital response generation system 102 implements domain processing 218 to select (and utilize) a model that corresponds to the query classification. For example, the digital response generation system 102 utilizes a neural ranking model 220 for product queries, a conversational model 222 for conversational queries, and a recommendation and purchase model 224 for recommendation queries and for purchase queries.

Although the foregoing example illustrates generating a response based on the recommendation and purchase model 224, the digital response generation system 102 can also utilize the neural ranking model 220 and the conversation model 220 to generate digital responses (e.g., in circumstances where the query classification model identifies a product query or a conversational query). Additional detail regarding the neural ranking model 220 and the conversation model 222 is provided below (e.g., in relation to FIGS. 4-6, 9).

As shown in FIG. 2, upon generating a response to a query, the digital response generation system 102 can further utilize speech processing 208 to generate an audio response. For example, in cases where the digital response generation system 102 receives a verbally spoken query (e.g., where a user elects to receive audio responses), the digital response generation system 102 can generate an audio response for presentation by the client device 108. Indeed, the digital response generation system 102 can convert the digital text of the generated response into audio using speech synthesis 212 so that a user can hear the response in audio form. For example, the digital response generation system 102 can implement speech synthesis 212 to perform a text-to-phoneme conversion by converting each word of the digital text into a phonetic transcription and dividing the text into prosodic units such as phrases, clauses, and sentences. The digital response generation system 102 can further convert the phonetic transcriptions to sound using a target prosody (e.g., pitch contour and phoneme duration) and imposing the target prosody on an output speech (e.g., "voice"). In some embodiments, however, the digital response generation system 102 can utilize a third-party API to generate an audio version of a digital response.

To illustrate, in response to identifying a recommendation query or a purchase query, the digital response generation system utilizes a recommendation and purchase model 224 to generate a response to the query. As discussed above, the recommendation and purchase model 224 can comprise one or more neural networks (or another machine learning model) and can generate a response that includes information relevant to the query. For example, the digital response generation system 102 can utilize a recommendation and purchase model 224 that includes one or more recurrent neural networks trained to generate responses based on query text.

To elaborate, the digital response generation system 102 can identify a product class corresponding to a product in the digital query. For example, as described, based on identifying a particular product from a digital image, the digital response generation system 102 can determine a product class of the product. The digital response generation system 102 can further access a product database 226 to identify products with the same or similar product class that share common characteristics with the product in the digital query.

For example, the digital response generation system 102 can maintain product class information for each product within the product database 226. In response to a digital query regarding a product, the digital response generation system 102 can identify a similar product from the same product category that shares one or more common characteristics (e.g., similar price, similar size, similar color, etc.). The digital response generation system 102 can select the similar product and generate a response that includes the similar product. Thus, based on identifying a query as a recommendation query, the digital response generation system 102 can generate a response that includes product information for a product with the same product class as the product indicated by the query.

In addition, the digital response generation system 102 can generate a response to a purchase query as well. For example, based on receiving a purchase query, the digital response generation system 102 accesses a product database 226 to determine information for generating a response to the query such as purchase information (e.g., price, location, discounts, payment information associated with a user, a purchase link, etc.). Moreover, the digital response generation system 102 generates a response that includes the relevant information for a given query. Indeed, the digital response generation system 102 can generate a response to a purchase query that includes payment information, coupons, a price of the product, and a link to similar products.

Figure 3:
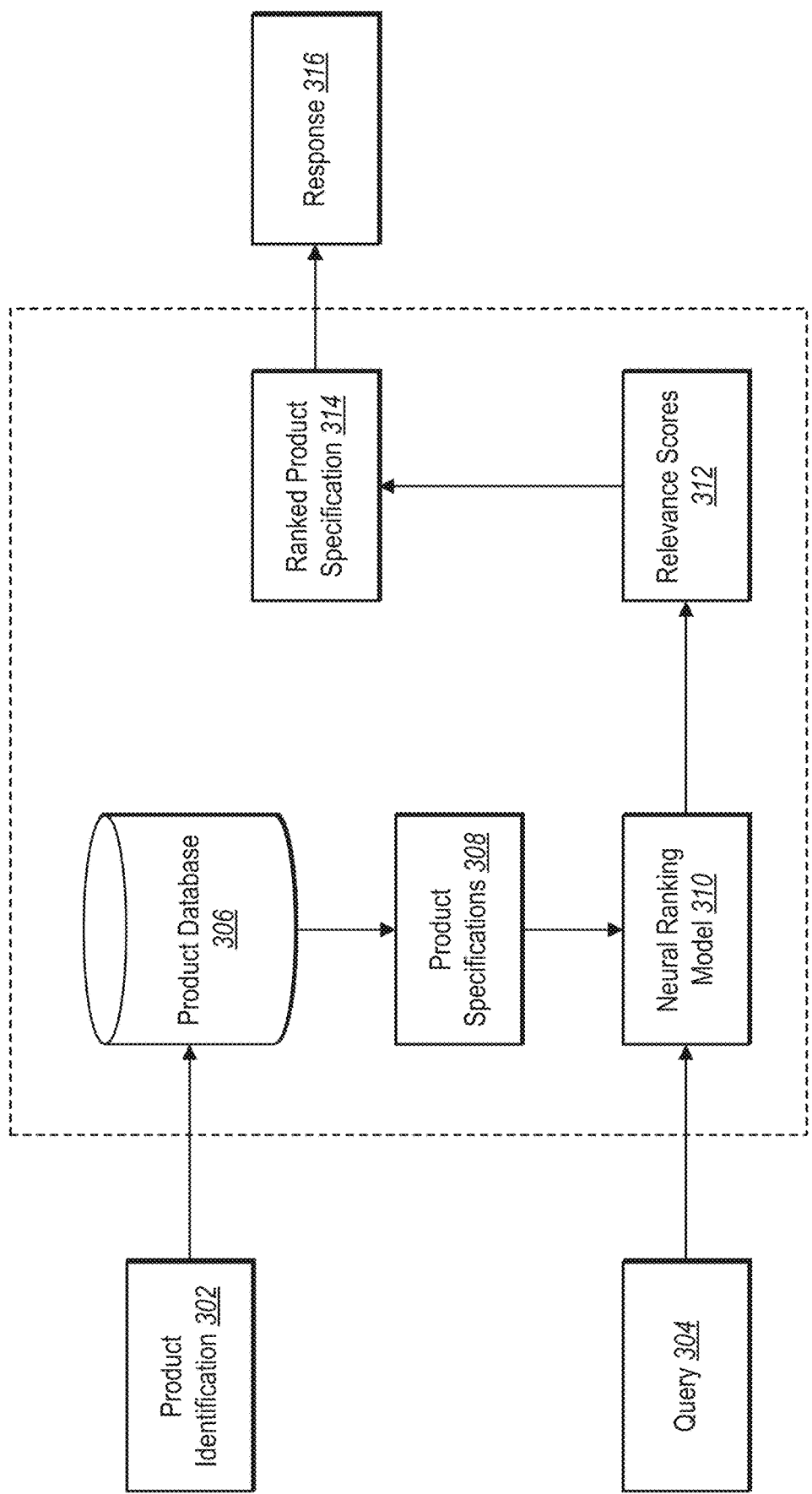
FIG. 3 illustrates generating a digital response to a product query in accordance with one or more embodiments.

As described above, the digital response generation system 102 can receive a query from the client device 108, where the query corresponds to a particular product (i.e., a product query), and the digital response generation system 102 can utilize a neural ranking model 220 to generate a response for the query. For example, FIG. 3 illustrates generating a response to a product query in accordance with one or more embodiments. As shown in FIG. 3, the digital response generation system 102 determines a product identification 302. To determine the product identification 302, the digital response generation system 102 receives a query 304 that indicates a particular product, and the digital response generation system 102 analyzes the query 304 to determine the product identification 302. In particular, the digital response generation system 102 analyzes the query 304 to determine a universal product code, a stock keeping unit, a serial number, or some other identification associated with a product indicated by the query 304.

For example, in some embodiments the digital response generation system 102 receives a query 304 that includes a digital image of a product. By analyzing the digital image using image analysis techniques, the digital response generation system 102 can determine a product identification from within the digital image. As described, the digital response generation system 102 can implement object recognition techniques (e.g., utilizing one or more neural networks or other techniques) to identify a product based on visual similarity to digital images of products stored within a product database. Indeed, the digital response generation system 102 can determine probabilities of a given digital image matching each of a plurality of products stored within a product database based on visual attributes of the digital image. The digital response generation system 102 can additionally or alternatively implement bar code recognition techniques, as also described above. In other embodiments, the digital response generation system 102 can analyze the text of the query 304 to determine the product identification 302 by identifying a product name, a serial number, or some other identifier within the text of the query 304.

Upon determining the product identification 302, the digital response generation system 102 accesses a product database 306 to determine product specifications 308 associated with the identified product. For example, in response to receiving a query whereby the digital response generation system 102 identifies an office chair as the product, the digital response generation system 102 accesses the product database 306 to determine the product specifications for that particular office chair. In some embodiments, the digital response generation system 102 maintains the product database 306, while in other embodiments the product database 306 is maintained by a third party.

As further illustrated in FIG. 3, the digital response generation system 102 utilizes the product specifications 308 along with the query 304 as input for the neural ranking model 310 (e.g., the neural ranking model 220 of FIG. 2). To elaborate, the digital response generation system 102 utilizes a trained neural ranking model 310 to determine a relevance between product specifications 308 and the query 304. Accordingly, for each individual product specification within the product specifications 308, the digital response generation system 102 can utilize the neural ranking model 310 to generate a relevance score 312 with respect to the query 304. More specifically, the digital response generation system 102 utilizes the neural ranking model 310 to generate, for each of the product specifications 308, a probability that the product specification corresponds to the query 304.

To illustrate, for a query that asks, "How heavy is this office chair," the digital response generation system 102 can determine probabilities for a number of product specifications such as height, width, manufacturer, composition materials, country of origin, and weight. By utilizing the neural ranking model 310, the digital response generation system 102 can determine the relevance scores 312 for each of the product specifications (e.g., where the relevance scores for height, width, manufacturer, composition material, and country of origin are all relatively low because they do not correspond to (e.g., match) the language of the query).

As shown, the digital response generation system 102 can generate ranked product specifications 314 based on each of the respective relevance scores of the product specifications 308. In particular, the digital response generation system 102 can rank the product specifications 308 from lowest relevance score to highest relevance score. In addition, the digital response generation system 102 can select (one or more) of the product specification (e.g., those with the highest relevance scores or those that satisfy a relevance threshold) as the product specification that corresponds to the query 304.

As further shown, the digital response generation system generates a response 316. In particular, the digital response generation system 102 can generate a digital response that indicates the (one or more) selected product specification. To generate the response 316, the digital response generation system 102 can utilize one of a number of preset (e.g., user-generated, administrator-generated, or system-generated) response templates and can insert any necessary information to provide to a client device to answer the query 304. For example, the digital response generation system 102 can have a template for each of a number of specification types. Indeed, the digital response generation system 102 can have a template for queries relating to weight such as "The weight of this product is _____." The digital response generation system 102 can fill the template with a corresponding product specification weight identified from the product database.

Likewise, the digital response generation system 102 can further have different templates for queries relating to height, speed, duration, longevity, voltage, speed, or any other metric that may be indicated in a query. In this way, the digital response generation system 102 can generate the response 316 by implementing a conversational text generation technique to provide information relating to the selected product specification. Although not illustrated in FIG. 3, the digital response generation system 102 can further provide the response 316 to a client device (e.g., client device 108).

Figure 4:
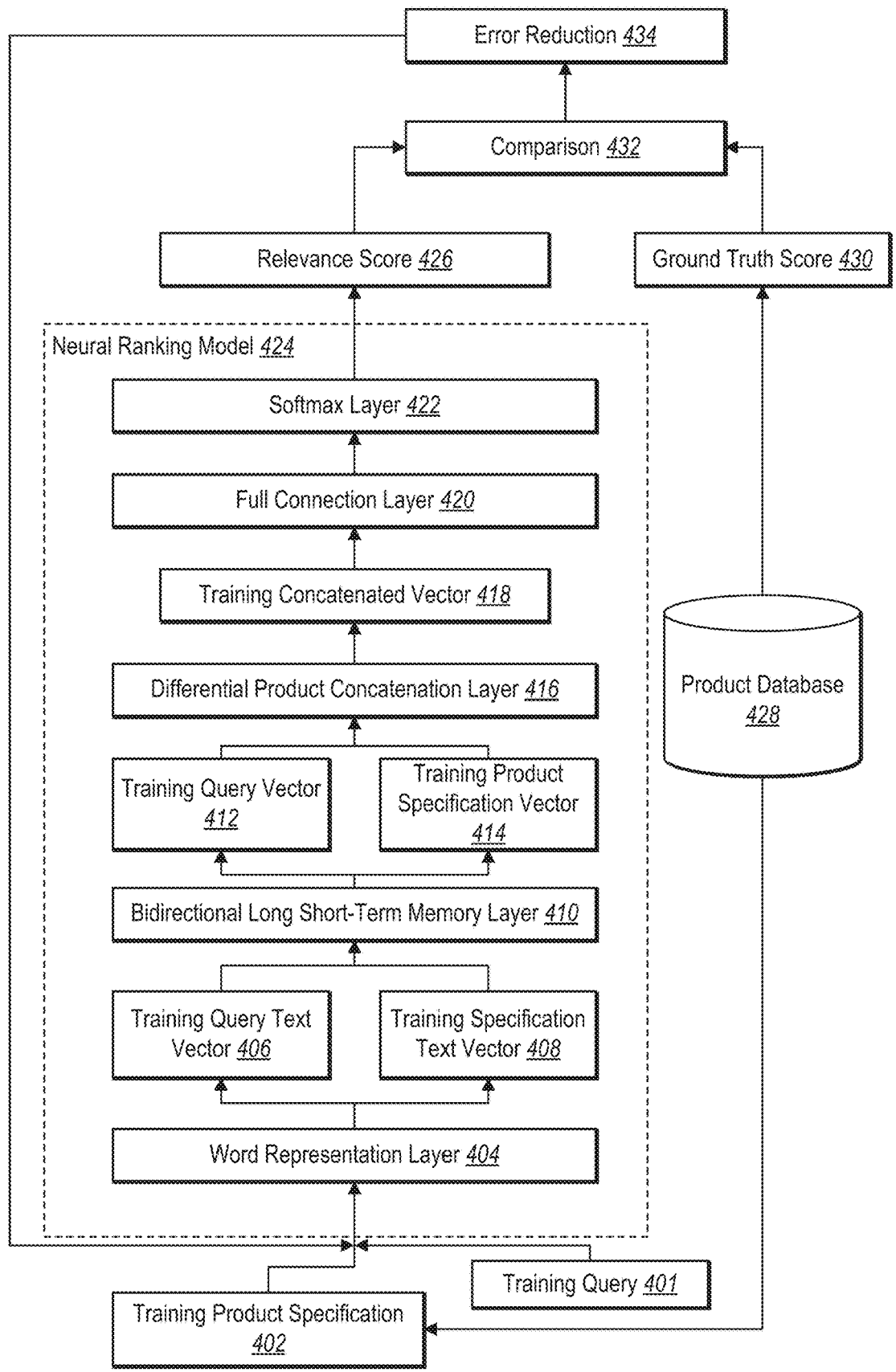
FIG. 4 illustrates training a neural ranking model in accordance with one or more embodiments.

As mentioned, the digital response generation system 102 utilizes a trained neural ranking model 310 to generate relevance scores for product specifications with respect to a received query. Indeed, FIG. 4 illustrates training a neural ranking model 424 (e.g., the neural ranking model 310) including a number of different layers. The description of FIG. 4 relates primarily to training the neural ranking model 424 and a high-level discussion of the various layers of the neural ranking model 424. Thereafter, the description of FIG. 5 relates to more granular details of the architecture of a neural ranking model, including the various layers and functionality.

As illustrated in FIG. 4, the digital response generation system 102 trains the neural ranking model 424 based on training data such as a training query 401 and a training product specification 402. In some embodiments, the digital response generation system 102 trains and evaluates the neural ranking model 424 using two different training settings. In these embodiments, the digital response generation system 102 stores the pertinent information for products such as prices, specifications, discounts, etc. within the product database 428. In addition, the digital response generation system 102 selects three sets of queries that the digital response generation system 102 utilizes to train the neural ranking model 424. For example, the digital response generation system 102 divides a pool of queries (e.g., 7000 queries collected via AMAZON MECHANICAL TURK) into three sets: a training set, a development set, and a test set. The discussion of FIG. 4 relates primarily to the training set. The use of the test set is described in further detail below with reference to FIG. 10 in relation to evaluating the accuracy of the digital response generation system 102.

For the first training setting, the digital response generation system 102 divides the data so that the test set has no products in common with the training set or the development set. For the second training setting, the digital response generation system 102 divides the data so that the test set has no product specifications in common with the training set or the development set. In some embodiments, the digital response generation system 102 further divides the pool of collected queries among the training set, the development set, and the test set at roughly 80%, 10%, and 10%, respectively, for both the first training setting and the second training setting.

For both the first training setting and the second training setting, the digital response generation system 102 accesses a product database 428 (e.g., the product database 116 of FIG. 1) to identify training product specifications including the training product specification 402. The digital response generation system 102 utilizes the training product specification 402 and the training query 401 as input into the neural ranking model 424. In some embodiments, the digital response generation system 102 utilizes all possible query-specification pairs to train the neural ranking model 424. For instance, if there are k training queries about a training product and the training product has h product specifications, then there are h×k query-specification examples related to the training product, and exactly k of them are positive examples.

As shown in FIG. 4, the digital response generation system 102 inputs a training product specification 402 and a training query 401 into the word representation layer 404 of the neural ranking model 424. The digital response generation system 102 implements a word representation layer 404 of the neural ranking model 424 to generate, for the training query 401, a training query text vector 406 and, for the training specification 402, a training specification text vector 408. Indeed, as described above, the digital response generation system 102 utilizes a word representation layer 404 of the neural ranking model 424 to generate text vector representations of the training query 401 and the training product specification 402. For example, the word representation layer 404 can include a word2vec algorithm, a GloVe algorithm, or an embedding layer trained based on a word2vec algorithm and/or a GloVe algorithm.

In addition, the digital response generation system 102 implements a bidirectional long short-term memory layer 410 of the neural ranking model 424. The output of the bidirectional long short-term memory layer 410 is a sequence of vectors. A max-pooling operation is applied to the set of vectors in the output sequence to generate a final vector representation.

More specifically, the digital response generation system 102 implements the bidirectional long short-term memory layer 410 to generate a sequence of vectors, where each vector in the sequence corresponds to one position in the original input sequence. Additionally, the digital response generation system 102 can apply a max-pooling operation to the sequence of vectors to generate a training query vector 412. In a similar fashion, the digital response generation system 102 can apply a max-pooling operation to generate a training product specification vector 414 based on generating a sequence of vectors from the training specification text vector 408. Indeed, the digital response generation system 102 generates, by the bidirectional long short-term memory layer, a training query vector 412 that corresponds to the training query text vector 406. Additionally, the digital response generation system 102 generates, by the bidirectional long short-term memory layer, a training product specification vector 414 that corresponds to the training specification text vector 408.

As further shown, the digital response generation system 102 implements a differential product concatenation layer 416 of the neural ranking model 424 to generate a training concatenated vector 418. To elaborate, the digital response generation system 102 utilizes the differential product concatenation layer 416 to determine a difference between the training query vector 412 and the training product specification vector 414, and to further determine an element-wise product of the training query vector 412 and the training product specification vector 414. Furthermore, the digital response generation system 102 utilizes the differential product concatenation layer 416 to concatenate the difference between the training query vector 412 and the training product specification vector 414 with the element-wise product of the training query vector 412 and the training product specification vector 414 to generate a training concatenated vector 418 that includes features of both the training query vector 412 and the training product specification vector 414.

As further illustrated in FIG. 4, the digital response generation system 102 utilizes a full connection layer 420 and a softmax layer 422 to generate a relevance score 426 based on the training concatenated vector 418. In particular, the digital response generation system 102 utilizes the full connection layer 420 and the softmax layer 422 to determine a probability that the training product specification 402 corresponds to the training query 401. As mentioned, the digital response generation system 102 can utilize the full connection layer 420 and the softmax layer 422 to generate a relevance score 426 in the form of a percentage or a numerical score (e.g., 0 to 1), where higher numbers indicate higher degrees of relevance between the training product specification 402 and the training query 401.

As shown, the digital response generation system 102 further performs a comparison 432 between the relevance score 426 and a ground truth score 430. In particular, the digital response generation system 102 utilizes a binary "yes" or "no" classification technique where the training objective is to minimize cross entropy of query-specification pairs. For example, the digital response generation system 102 determines whether the training product specification 402 corresponds to the training query 401—i.e., "yes" or "no."

The digital response generation system 102 accesses the product database 428 and the pool of training queries (e.g., as collected via AMAZON MECHANICAL TURK) to identify a ground truth score 430 that corresponds to the training product specification 402—i.e., a score that reflects the true relevance of the training product specification 402 with respect to the training query 401. In addition to identifying the ground truth score 430, the digital response generation system 102 compares the ground truth score 430 with the generated (e.g., predicted) relevance score 426 that is output by the neural ranking model 424. By comparing the ground truth score 430 with the relevance score 426, the digital response generation system 102 determines a measure of loss (e.g., an error) between the ground truth score 430 and the relevance score 426. For instance, the digital response generation system 102 can determine a measure of loss given by:

$$\mathrm{loss}(\theta) = -\log \prod_i p_\theta(y^{(i)} | Q^{(i)}, S^{(i)})$$

where $Q^{(i)}$ and $S^{(i)}$ represent a query-specification pair within the training set (e.g., training product specification 402 and training query 401), $y^{(i)}$ indicates whether the product specification $S^{(i)}$ is relevant to query $Q^{(i)}$, and $p_\theta$ is the predicted (e.g., generated) probability with model weights $\theta$.

In addition to performing the comparison 432, as shown in FIG. 4, the digital response generation system 102 further performs error reduction 434 to reduce the error or the measure of loss determined by way of the comparison 432. To illustrate, the digital response generation system 102 implements one or more of various error reduction techniques such as classical stochastic gradient descent, mean squared error reduction, or standard error reduction. By implementing the error reduction 434, the digital response generation system 102 modifies parameters of the neural ranking model (e.g., the full connection layer 420 and the bidirectional long short-term memory layer 410) to reduce the measure of loss between the ground truth score 430 and the relevance score 426.

As further shown, the digital response generation system 102 repeats the training process illustrated in FIG. 3 for different training product specifications and for different training queries. In particular, as part of training the neural ranking model 424, the digital response generation system 102 tunes the hyper-parameters of the layers within the neural ranking model 424 using the development set mentioned above (e.g., the development set from the dataset of the product database 428).

For a given training query (e.g., training query 401), the digital response generation system 102 identifies a plurality of training product specifications and implements the neural ranking model 424 as described to generate a relevance score for each of the training product specifications individually. Furthermore, the digital response generation system 102 can identify a new training query and new training product specifications and, by repeating the process described in relation to FIG. 4, can train or tune the neural ranking model 424 to increase in accuracy and to correctly determine relevance scores—i.e., to determine relevance scores that are within a threshold error (or measure of loss) of their respective ground truth scores.

Indeed, the digital response generation system 102 can train the neural ranking model 424 based on training data from a product database 428 such as a particular retail website. As an example, in one or more embodiments the digital response generation system 102 trains the neural ranking model 424 based on products listed from a retailer website, where the training data can include a number (e.g., 6,922) of query-specification pairs that cover a number (e.g., 369) of types of product specifications for a number (e.g., 148) of different products.

Figure 5:
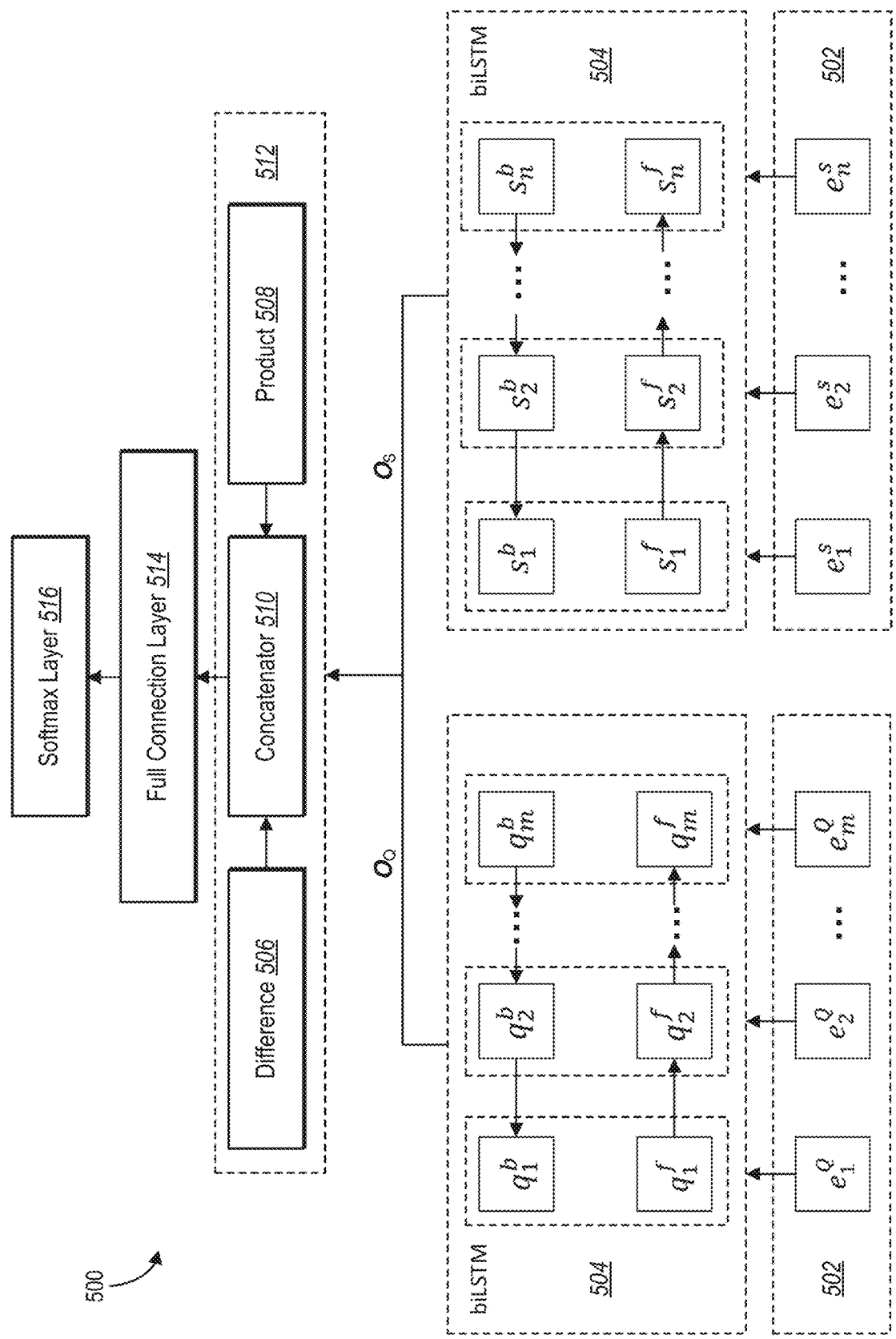
FIG. 5 illustrates layers of a neural ranking model in accordance with one or more embodiments.

As mentioned, the neural ranking model 424 includes various layers. FIG. 5 illustrates additional detail for a neural ranking model 500 (e.g., the neural ranking model 324), including more granular details of the various layers therein. As shown in FIG. 5, the neural ranking model 500 includes a word representation layer 502. By implementing the word representation layer 502 as described, the digital response generation system 102 transforms a received query Q and a product specification S into sentences (e.g., sentence vectors) by:

$$Q_e = [e_1^Q, e_2^Q, \ldots, e_m^Q]$$

and $$S_e = [e_1^S, e_2^S, \ldots, e_n^S]$$

where $e_i^Q$ is the embedding of the $i^{th}$ word of the query, $e_j^S$ is the embedding of the $j^{th}$ word of the product specification (e.g., the text of the product specification), and m and n are the lengths of Q and S, respectively.

As illustrated in FIG. 5, the neural ranking model 500 further includes a bidirectional long short-term memory layer 504. In particular, by implementing the bidirectional long short-term memory layer 504, the digital response generation system 102 generates a context-aware vector representation at each position of Q and S. More specifically, the digital response generation system 102 utilizes $Q_e$ and $S_e$ as individual inputs into a parameter-shared bidirectional long short-term memory layer 504. By implementing the bidirectional long short-term memory layer 504 (as opposed to single-directional), the digital response generation system 102 utilizes both the previous and future contextual information of the tokens within the layer to generate two sequences of output vectors for each input sequence. Thus, for the query Q, the digital response generation system 102 generates two sequences of output vectors, one for each direction, given by:

$$q_i^f = \overrightarrow{\mathrm{LSTM}}(q_{i-1}^f, e_i^Q) i = 1, \ldots, m$$

$$q_i^b = \overleftarrow{\mathrm{LSTM}}(q_{i+1}^b, e_i^Q) i = m, \ldots, 1$$

where $q_i^f$ is a vector representation of the first i words in the query (i.e., $[e_1^Q, e_2^Q \ldots, e_i^Q]$) and $q_i^b$ is a vector representation of the context of the last m−i+1 words in the query (i.e., $[e_m^Q, e_{m-1}^Q \ldots, e_i^Q]$).

Similarly, by utilizing the bidirectional long short-term memory layer 504 for the product specification S, the digital response generation system 102 generates two sequences of output vectors, one for each direction, given by:

$$s_j^f = \overrightarrow{\mathrm{LSTM}}(s_{j-1}^f, e_j^S) j = 1, \ldots, n$$

$$s_j^b = \overleftarrow{\mathrm{LSTM}}(s_{j+1}^b, e_j^S) j = n, \ldots, 1$$

where $s_j^f$ is a vector representation of the first j words in the name of the product specification (i.e., $[e_1^S, e_2^S, \ldots, e_j^S]$) and $s_j^b$ is a vector representation of the context of the last n−j+1 words in the product specification (i.e., $[e_n^S, e_{n-1}^S, \ldots, e_j^S]$).

Additionally, the digital response generation system concatenates the two corresponding output sequences from each direction to generate a context-aware vector representation at each position of Q and S. For example, the digital response generation system 102 concatenates the output sequences by:

$$q_i = q_i^f \| q_i^b$$

and $$s_j = s_j^f \| s_j^b.$$

The digital response generation system 102 further performs a max-pooling operation with respect to the context-aware vector representations, $q_1$ and $s_j$. As a result, the digital response generation system 102 generates a query vector represented by $o_Q$, and the digital response generation system 102 also generates a product specification vector represented by $o_S$.

As further shown, the digital response generation system 102 utilizes a differential product concatenation layer 512 to determine a difference vector 506 between the query vector and the product specification vector. In addition, the digital response generation system 102 utilizes the differential product concatenation layer 512 to determine a product vector 508 of the query vector and the product specification vector. To illustrate, the digital response generation system 102 utilizes the differential product concatenation layer 512 to generate an absolute difference feature vector 506 given by:

$$|o_Q - o_S|$$

and to generate a product feature vector 508 given by:

$$|o_Q \odot o_S|.$$

Additionally, the digital response generation system 102 utilizes the differential product concatenation layer 512 to concatenate the difference feature vector 506 with the product feature vector 508. For example, the digital response generation system 102 generates a concatenated vector by way of the concatenator 510. To illustrate, the digital response generation system 102 utilizes the concatenator 510 of the differential product concatenation layer 512 to generate a concatenated vector that includes one or more features of the difference feature vector 506 and one or more features the product feature vector 508.

As further shown in FIG. 5, the digital response generation system 102 further utilizes a full connection layer 514 and a softmax layer 516 of the neural ranking model 500. In particular, the digital response generation system 102 feeds the concatenated vector into the full connection layer 514. By way of the full connection layer 514, the digital response generation system 102 weights the features of the concatenated vector and feeds a feature vector to the softmax layer 516.

Furthermore, the digital response generation system 102 utilizes the softmax layer 516 to generate a relevance score based on the feature vector from the full connection layer 514. For instance, the digital response generation system 102 generates a probability that the product specification S corresponds to the query Q. As mentioned, the digital response generation system 102 can utilize the neural ranking model 500, including the various layers therein, to generate relevance scores for each of a number of product specifications (e.g., $S_1, S_2, \ldots, S_n$) associated with a product identified from the query Q. Indeed, FIG. 6 illustrates determining various relevance scores and comparing the relevance scores to identify a relevance score and a corresponding product specification that corresponds to a received query.

Figure 6:
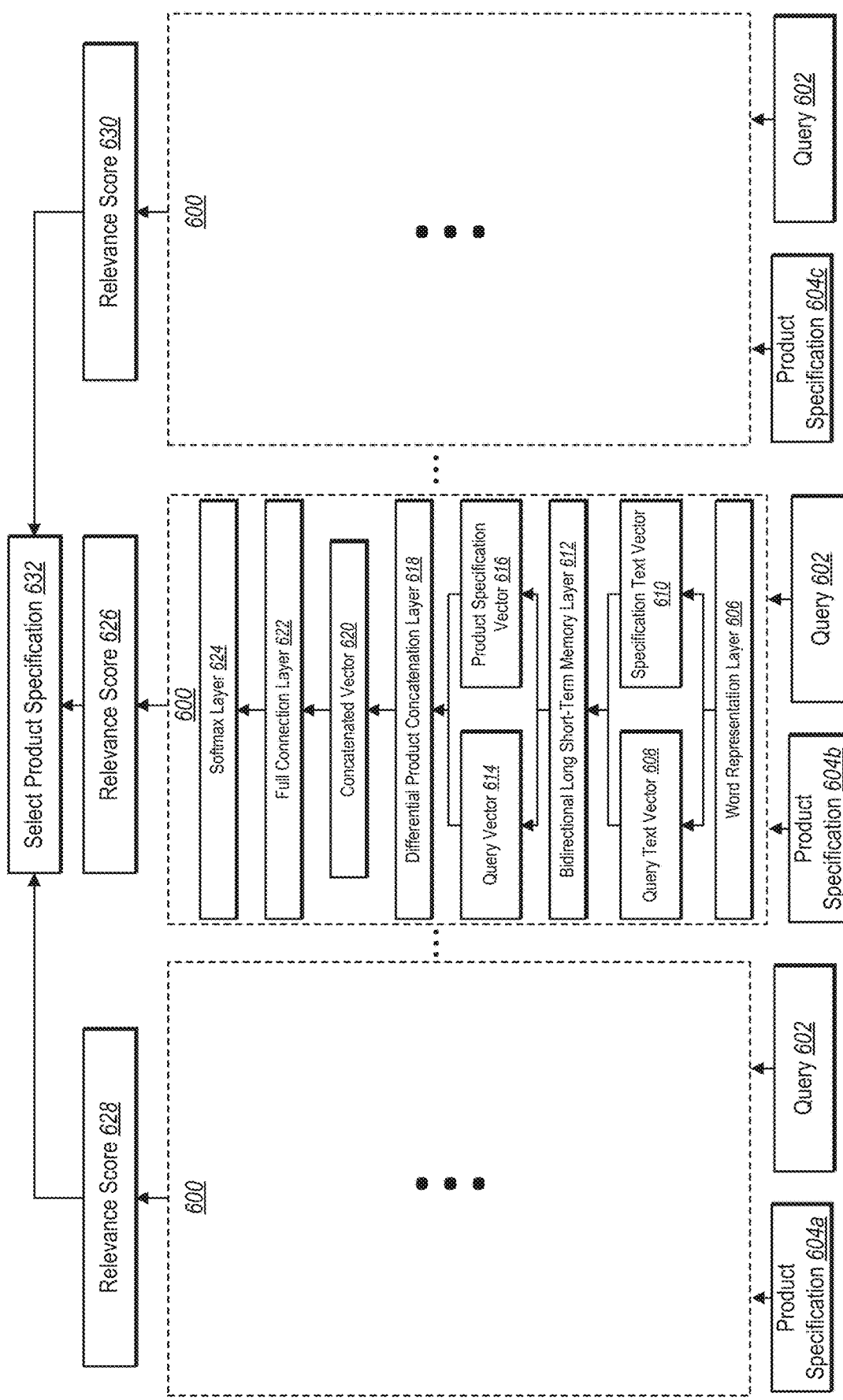
FIG. 6 illustrates utilizing a neural ranking model in accordance with one or more embodiments.

As illustrated in FIG. 6, the digital response generation system 102 utilizes the neural ranking model 600 (e.g., the neural ranking model 500 or the neural ranking model 324) over multiple iterations to generate relevance scores for different product specifications with respect to a query 602. As described above, the digital response generation system 102 receives a query 602 from a client device and determines a product identification based on analyzing the query 602. Upon classifying the query as a product query (and identifying the product), the digital response generation system 102 further determines product specification 604a, product specification 604b, and product specification 604c (referred to herein collectively as "product specifications 604).

The digital response generation system 102 utilizes the trained neural ranking model 600 to analyze each of the product specifications 604 with respect to the query 602. In particular, the digital response generation system 102 inputs the query 602 and the product specification 604a into the neural ranking model 600 to determine a relevance score 628 that indicates a relevance between the product specification 604a and the query 602. Similarly, the digital response generation system 102 inputs the product specification 604b and the query 602 into the neural ranking model 600 to generate a relevance score 626 that indicates a relevance between the product specification 604b and the query 602. Likewise, the digital response generation system 102 inputs the product specification 604c and the query 602 into the neural ranking model 600 to generate the relevance score 630 that indicates a relevance between the product specification 604c and the query 602.

To generate the relevance scores 626, 628, and 630, the digital response generation system 102 utilizes the layers of the neural ranking model 600 described above. To illustrate with respect to the product specification 604a, the digital response generation system 102 inputs the query 602 and the product specification 604a into the word representation layer 606 of the neural ranking model 600. The digital response generation system 102 utilizes the word representation layer 606 to generates a query text vector 608 corresponding to the query 602 and to generate a specification text vector 610 corresponding to the product specification 604a.

In addition, the digital response generation system 102 inputs the query text vector 608 and the specification text vector 610 into the bidirectional long short-term memory layer 612 of the neural ranking model 600. The digital response generation system 102 utilizes the bidirectional long short-term memory layer 612 to generate a query vector 614 based on the query text vector 608 and to generate a product specification vector 616 based on the specification text vector 610 (as described above in relation to FIG. 5).

Furthermore, the digital response generation system 102 inputs the query vector 614 and the product specification vector 616 into the differential product concatenation layer 618 to generate a concatenated vector 620. Indeed, as described above, the digital response generation system 102 utilizes the differential product concatenation layer 618 to concatenate features of a difference feature vector with features of a product feature vector to generate a concatenated vector 620.

As further illustrated in FIG. 6, the digital response generation system 102 utilizes the full connection layer 622 and the softmax layer 624 to generate the relevance score 628. As also illustrated, the digital response generation system 102 generates the relevance scores 626 and 630 for the product specifications 604b and 604c. Indeed, the digital response generation system 102 generates a relevance score for each product specification with respect to the query 602, and the digital response generation system further performs act 632 to select a product specification.

To illustrate, the digital response generation system 102 compares the relevance scores 626, 628, and 630 as described above. For example, the digital response generation system 102 ranks the product specifications 604 according to their respective relevance scores, and the digital response generation system further selects a product specification with the highest relevance score as the product specification that is most relevant to the query 602.

While FIG. 6 illustrates three iterations of the neural ranking model 600, one for each of the product specifications 604, in some embodiments the digital response generation system 102 may determine more or fewer than three product specifications. Accordingly, in cases where the digital response generation system 102 identifies more than three product specifications based on a given query, the digital response generation system 102 can utilize the neural ranking model 600 to generate a relevance score for each of the product specifications, and the digital response generation system 102 can further select a product specification that is most relevant to the query 602 by comparing the relevance scores.

As mentioned, the digital response generation system 102 can also generate a response to provide to a client device 700 (e.g., client device 108). Indeed, FIGS. 7A-7E illustrate providing responses to a client device 700 (e.g., client device 108) based on queries. As illustrated in FIG. 7A, the digital response generation system 102 can capture and/or receive a digital image of a particular product. Indeed, the digital response generation system 102 can provide a user interface 701 of a product inquiry application (e.g., product inquiry application 110) whereby a user can capture a digital image of a product using the client device 700. For example, the client device 700 can capture a digital image of a product (e.g., a lantern) while shopping in a brick and mortar store. The digital response generation system 102 can then initiate a conversation regarding the object(s) portrayed in the digital image.

For example, as discussed above, the digital response generation system 102 can analyze the digital image illustrated in FIG. 7A to identify the product (e.g., the lantern). The digital response generation system 102 can then provide information regarding the identified product within a communication user interface (e.g., a chat user interface).

Figure 7B:
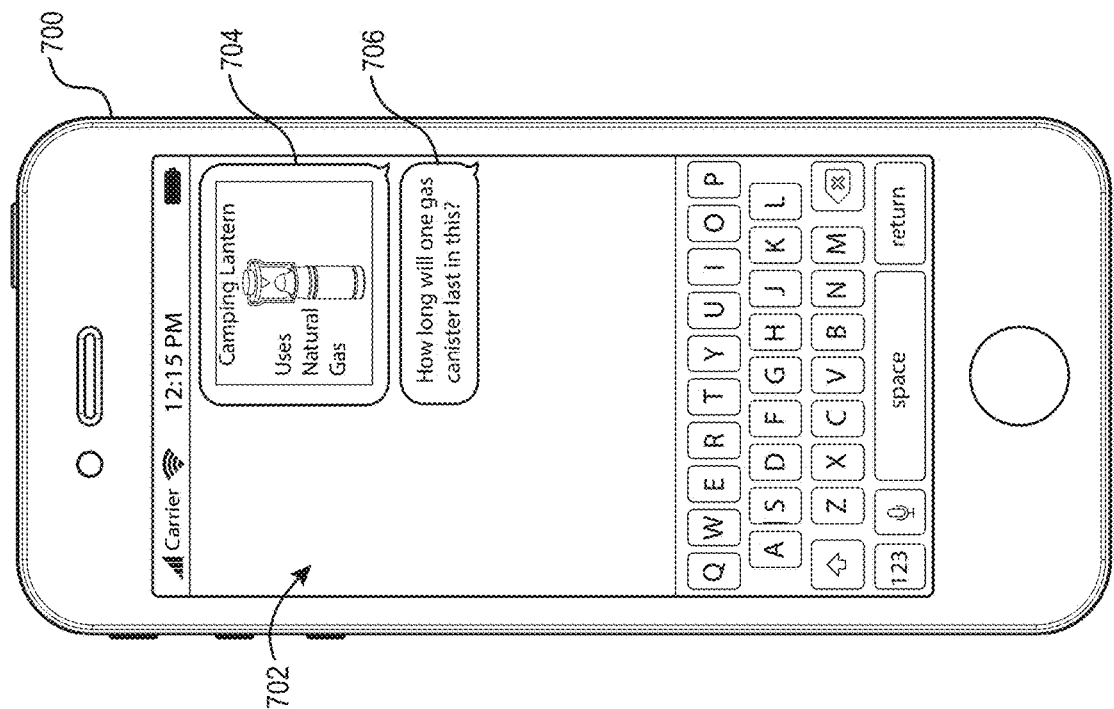
Figure 7A:
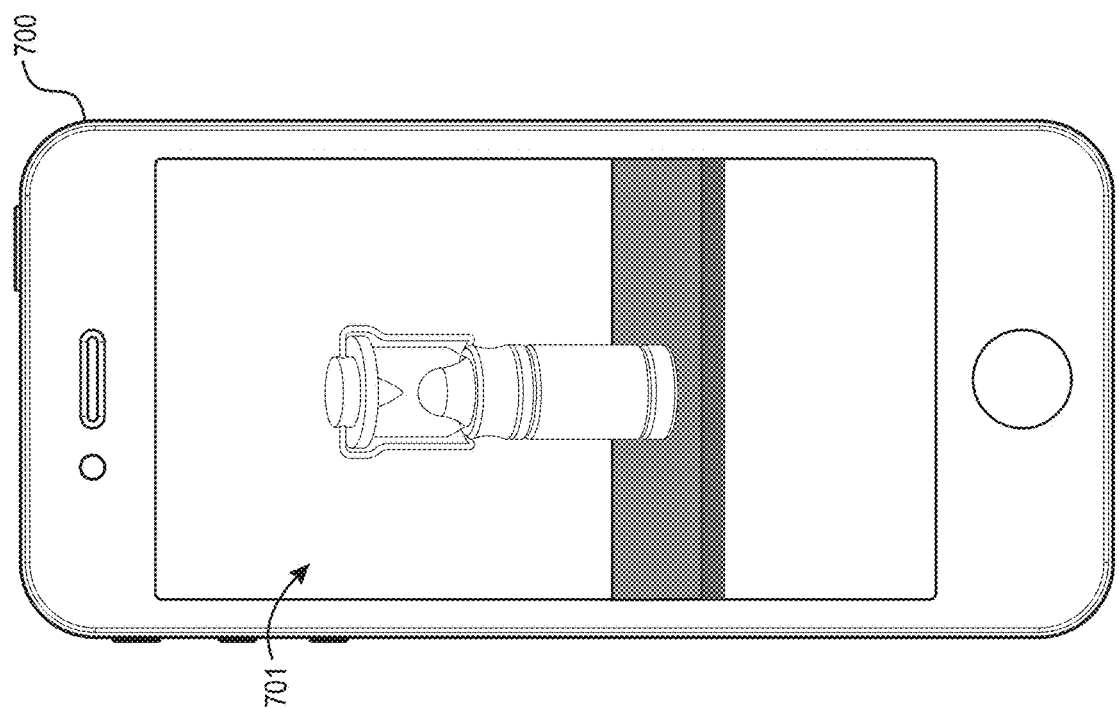

For example, as illustrated in FIG. 7B, the digital response generation system 102, via the client device 700, displays a user interface 702 of a product inquiry application (e.g., the product inquiry application 110). The user interface 702 includes a user interface element 704 describing the identified product as part of a digital message window (e.g., for displaying a sequence of digital messages). The user of the client device 700 can enter a digital query via the product inquiry application 110. Indeed, as shown in FIG. 7B, the user interface 702 also includes a digital query 706. While FIG. 7B illustrates the digital image 704 separate from the query 706, in some embodiments, a query includes both a text portion and a digital image.

The digital response generation system 102 receives the query 706 (which can include the captured digital image or a product identifier corresponding to the interface element 704) from the client device 700. The digital response generation system 102 analyzes the query 706 to classify the query 706 as a product query by way of a query classification model. In addition, the digital response generation system 102 determines a product identification of a product corresponding to the query 706. For example, the digital response generation system 102 can identify the product directly from the query 706 (e.g., where the query includes a product identifier corresponding to the interface element 704). As described above, the digital response generation system 102 can also perform an image analysis technique to identify a product depicted within a digital image (e.g., the digital image captured via the user interface 701). For example, the digital response generation system 102 identifies a universal product code or other product identifier associated with the product. In some embodiments, the digital response generation system 102 implements a machine learning model to analyze the digital image 704 to recognize the product depicted within the digital image 704.

Upon determining the product identification, the digital response generation system 102 determines product specifications associated with the product, as described above. For example, the digital response generation system 102 accesses a product database to identify product specifications associated with the query 706). As described above, the digital response generation system 102 further utilizes a neural ranking model to select a product specification from among the product specifications identified within the database that corresponds (is most relevant) to the query 706.

To illustrate, the digital response generation system 102 utilizes the neural ranking model to analyze the query 706 to match a product specification with the query 706. Indeed, FIG. 7C illustrates providing a response 708 to the client device 700. As shown in FIG. 7C, the digital response generation system 102 generates the response 708, which includes an indication of a selected product specification that corresponds to the query 706. As illustrated, the query 706 asks "How long with one gas canister last in this?" In response, the digital response generation system 102 generates and provides the response 708, "Each canister lasts for approximately 30 hours."

The digital response generation system 102 first generates the response 708 using one of a number of response generation templates. For example, the digital response generation system 102 can create response generation templates (e.g., based on user input from an administrator) which the digital response generation system 102 can utilize to generate responses. As described above, the digital response generation system 102 can generate template corresponding to specification types or metrics. For example, based on determining that a query asks a question about a particular metric relating to a product, the digital response generation system 102 can generate a response using the appropriate template that corresponds to the particular metric. For example, based on receiving a query that asks about a products height, the digital response generation system 102 can utilize a height template and can fill in the appropriate product specification to generate a response.

While FIG. 7B illustrates generating a digital response corresponding to a product query, the digital response generation system can provide a variety of responses corresponding to a variety of queries. For example, the digital response generation system 102 can receive multiple queries and provide a response for every received query. In some cases, the digital response generation system 102 receives one query at a time and iteratively provides a corresponding response to each query. In other cases, the digital response generation system 102 can receive many queries at once (e.g., in the same message or in multiple messages), and the digital response generation system 102 can generate a response to each query to provide to the client device 700.

As mentioned, the digital response generation system 102 can generate and provide responses to a variety of queries. Indeed, the digital response generation system 102 can generate responses for conversational queries, recommendation queries, and purchase queries. To illustrate, FIG. 7D shows the client device 700 including the user interface 702. Indeed, the user interface 702 show additional digital messages within a single message thread. Accordingly, the user interface 702 of FIG. 7D includes the query 706, the response 708, and further includes a query 710 and a corresponding response 712.

To generate and provide the response 712, the digital response generation system 102 receives the query 710. In addition, the digital response generation system 102 utilizes a query classification model to classify the query as a recommendation query. More specifically, the digital response generation system 102 analyzes the query 710 to determine that, based on the language of the query 710, the query indicates a request for lanterns that are less expensive than the lantern depicted in digital image 704. Indeed, the digital response generation system 102 can generate the response 712 based on the context of an entire conversation by considering (e.g., analyzing, recalling, and/or looking up information relating to) previous queries and/or digital images. Accordingly, the digital response generation system 102 accesses a product database to identify lanterns that have prices lower than the lantern shown in the digital image 704, and the digital response generation system 102 generates the response 712 to include a digital image of a lantern that satisfies the request indicated by the query 710.

Figure 7E:
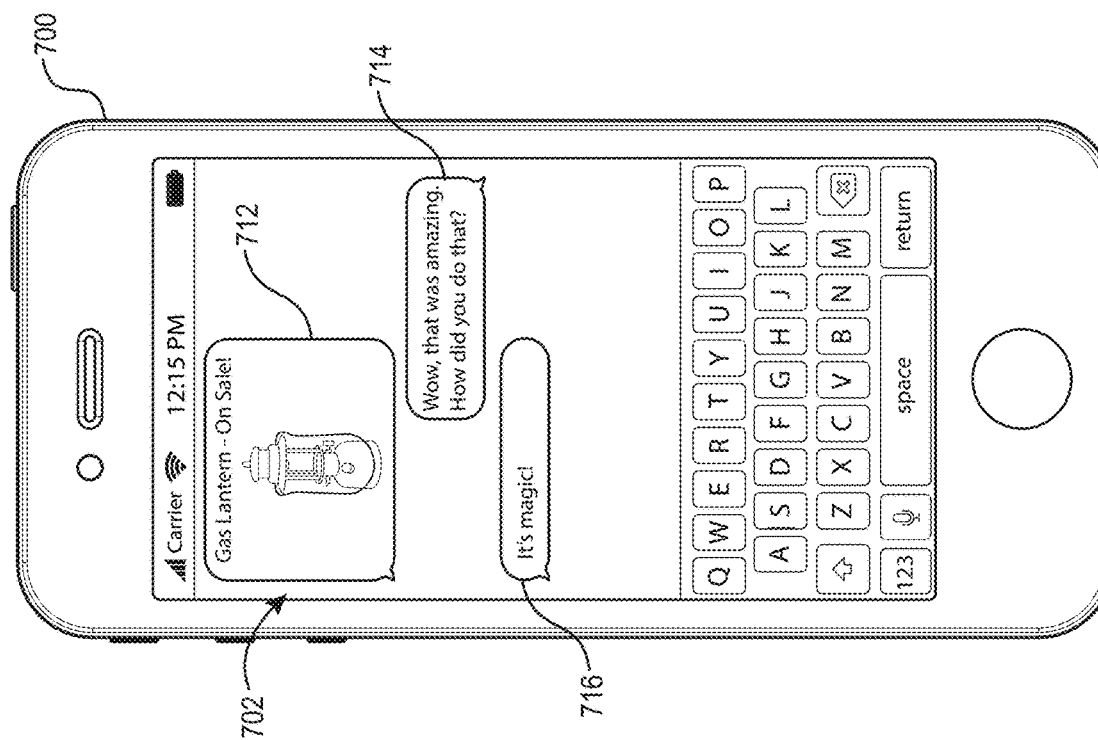

Similarly, the digital response generation system 102 can also generate responses to conversational queries. For example, FIG. 7E illustrates the client device 700 presenting the user interface 702 that includes a query 714 and a response 716. Indeed, the digital response generation system 102 can receive the query 714 from a client device that asks, "Wow, that was amazing. How did you do that?" As described, upon receiving the query, the digital response generation system 102 can utilize a query classification model to classify the query 714 as a conversational query. Based on classifying the query 714 as a conversational query, the digital response generation system 102 can utilize a conversational model (e.g., conversational model 222) to generate the response 716. For instance, the digital response generation system 102 can generate a conversational response of "It's magic!" to response to the conversational query 714. Additional detail regarding how the digital response generation system 102 generates a response to a conversational query is provided hereafter with reference to FIG. 8.

Although not illustrated in FIGS. 7A-7E, the digital response generation system 102 can further provide augmented reality or virtual reality content to the client device 700. Indeed, upon receiving a query that asks to see a particular product such as a couch within a living room, the digital response generation system 102 can generate and provide an augmented reality or virtual reality environment for a user to view the couch within a living room.

For augmented reality, for example, the digital response generation system 102 can generate and render a three-dimensional object that looks like a product (e.g., a couch) and that scales the product to fit within a user's real-world surroundings. Thus, as a user views surroundings via the client device 700, the digital response generation system 102 places the couch as a virtual object at a particular world-fixed location within the surroundings. Thus, the user can get a better feel for whether or not to purchase the product.

For virtual reality, the digital response generation system 102 can generate and provide a virtual environment that includes a virtual object that looks like a particular product. Rather than rendering a three-dimensional object to appear as though it is within a real-world environment (as is done for augmented reality), the digital response generation system 102 instead generates a virtual environment (e.g., a virtual living room) viewable via the client device 700 and that includes a rendering of the particular product therein.

By utilizing one or more embodiments described herein, the digital response generation system 102 can reduce or eliminate the time, expense, and resources required to utilize individuals or crowd-sourcing techniques to answer user queries. Indeed, the digital response generation system 102 automatically carries on a conversation with a user via a client device by generating responses to various types of queries to not only provide a user with requested information, but to also provide product recommendations, engage in conversation with the user, and assist in the purchase process. Thus, the digital response generation system 102 can reduce the manpower (and/or distributed computer power) required to assist customers in researching and purchasing products.

Figure 8:
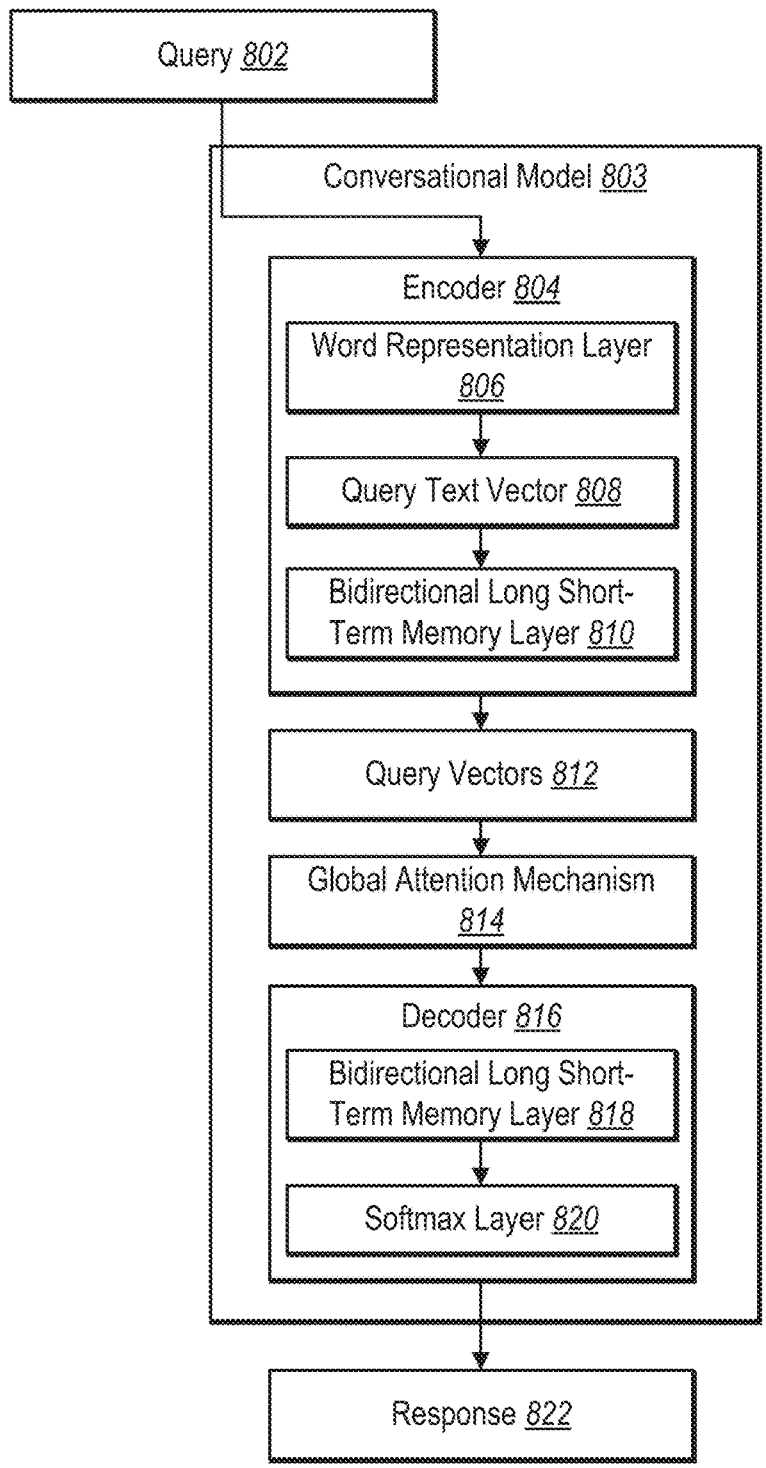
FIG. 8 illustrates components of a conversational model in accordance with one or more embodiments.

As mentioned, in one or more embodiments, the digital response generation system 102 utilizes a conversational model to generate a response to a conversational query. FIG. 8 illustrates a conversational model 803 that includes an encoder 804, a global attention mechanism 814, and a decoder 816. In particular, as illustrated in FIG. 8, the digital response generation system 102 receives a query 802 and inputs the text of the query 802 into the conversational model 803 to generate the response 822. Indeed, the conversational model 803 can be based on a sequence-to-sequence (seq2seq) model consisting of two recurrent neural networks: the encoder 804 and the decoder 816. Thus, given a set of inputs (e.g., words in the query 802), the conversational model 803 determines conditional probabilities of relevant words for the response 822.

More specifically, the digital response generation system 102 utilizes the encoder 804 to generate a query vectors 812 and further utilizes the decoder 816 to generate the response 822 based on the query vectors 812. To elaborate, the digital response generation system 102 inputs the query 802 into the encoder 804. In addition, the digital response generation system 102 implements a word representation layer 806 as part of the encoder 804 to generate the query text vector 808. As similarly described above in relation to the neural ranking model, the digital response generation system 102 utilizes the word representation layer 806 to generate textual word representations of the query 802.

The digital response generation system 102 further utilizes a bidirectional long short-term memory layer 810 to generate the query vectors 812 based on the query text vector 808. In particular, the digital response generation system 102 utilizes a bidirectional long short-term memory layer 810 as similarly described above to generate a vector representation of the query 802. Each of the query vectors 812 corresponds to one position in the original input sequence.

In addition, as shown, the digital response generation system 102 utilizes the global attention mechanism 814. The global attention mechanism 814 can emphasize or draw attention to specific portions of the query to more accurately capture meaning of queries. Thus, the global attention mechanism 814 allows the decoder 816 to attend to specific parts of the query vectors 812 when decoding the query vectors 812, rather than relying only on the fixed-size query vectors 812.

To illustrate, in one or more embodiments, the output of the bidirectional long short-term memory layer 810 is a sequence of vectors, where each vector corresponds to one position in the original input sequence. During the decoding phase, the global attention mechanism 814 is used to determine which of the vectors in the output sequence of the encoder bidirectional long short-term memory layer 810 are important.

For example, in one or more embodiments, the digital response generation system 102 utilizes the global attention mechanism 814 to infer variable-length weight vectors based on current target states and source states and generate a global context vector as a weighted average over all source states. Specifically, the digital response generation system 102 can implement the global attention mechanism described in Minh-Thang Luong, Hieu Pham, and Christopher D. Manning, *Effective Approaches to Attention-based Neural Machine Translation*, CoRR, abs/1508.04025 (2015), which is incorporated herein by reference in its entirety. Accordingly, the digital response generation system 102 utilizes the decoder 816 including a bidirectional long short-term memory layer 818 and a softmax layer 820 to generate the response 822, one word at a time.

As mentioned, in some embodiments, the digital response generation system 102 trains the conversational model 803. To train the conversational model 803, the digital response generation system 102 collects query-response pairs from a source and uses the pairs as training data. For example, the digital response generation system 102 can collect query-response pairs (e.g., 3 million pairs) from an online database such as REDDIT to train the conversational model 803 to generate responses that feel conversational and natural to a user. To train the conversational model 803 using the training data, the digital response generation system 102 identifies a training query and inputs the training query into the conversational model 803 to generate a predicted response. The digital response generation system 102 further compares the predicted response with a ground truth response by, for example, using a loss function to determine a measure of loss between the predicted response and the ground truth response. In addition, the digital response generation system 102 tunes the conversational model 803 by adjusting parameters and reducing the measure of loss using the global attention mechanism 814.

Figure 10:
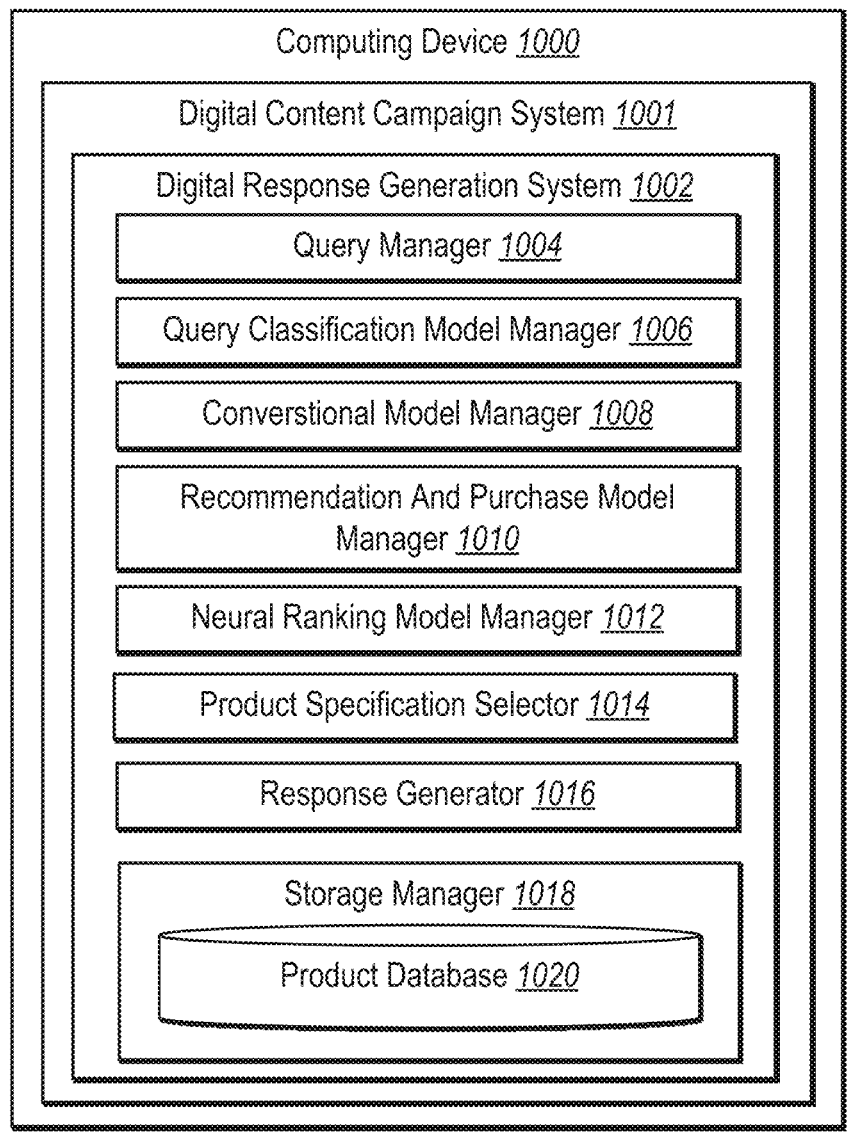
FIG. 10 illustrates a schematic diagram of a digital response generation system in accordance with one or more embodiments.

As mentioned, the digital response generation system 102 is highly efficient. For example, the digital response generation system 102 correctly selects product specifications based on received queries with a high degree of accuracy, while also requiring relatively little computer memory and processing power. Indeed, FIG. 10 illustrates a chart 900 depicting the accuracy of the digital response generation system 102. To evaluate the accuracy of the digital response generation system 102, as mentioned above, the digital response generation system 102 utilizes a test set of data and a development set of data.

In the test stage, the digital response generation system can utilize the test set to sort product specifications for a given product in descending order based on predicted probability of being relevant (e.g., relevance scores) to a query. In addition, the digital response generation system 102 can determine a top-1 accuracy (e.g., a probability that the digital response generation system 102 selects the correct product specification as the highest ranked product specification), a top-2 accuracy (e.g., a probability that the digital response generation system 102 selects the correct product specification as one of the two highest ranked product specification), and a top-3 accuracy (e.g., a probability that the digital response generation system 102 selects the correct product specification as one of the three highest ranked product specification).

As shown in FIG. 10, the digital response generation system 102 has a top-1 accuracy of 85.20%, a top-2 accuracy of 96.20%, and a top-3 accuracy of 98.00% based on a particular test set of data from the retail website as described above. Comparing the digital response generation system 102 with two state-of-the-art models (e.g., the unigram model and the IWAN model), the digital response generation system 102 has a better top-2 accuracy and top-3 accuracy than both of the other models. The digital response generation system 102 further has a top-1 accuracy that is nearly the same as the IWAN model, but which is better than the unigram model. While the IWAN model achieves a slightly better top-1 accuracy than the digital response generation system 102, the IWAN model is a more complex model that requires significantly more computer memory and processing power to implement than does the digital response generation system 102.

Looking now to FIG. 10, additional detail will be provided regarding components and capabilities of the digital response generation system 1002 (e.g., the digital response generation system 102). Specifically, FIG. 10 illustrates an example schematic diagram of the digital response generation system 1002 on an example computing device 1400 (e.g., one or more of the client device 108 and/or server(s) 104). As shown in FIG. 10, the digital response generation system 102 may include a query manager 1004, a query classification model manager 1006, a conversational model manager 1008, a recommendation and purchase model manager 1010, a neural ranking model manager 1012, a product specification selector 1014, a response generator 1016, and a storage manager 1018.

As mentioned, the digital response generation system 102 includes a query manager 1004. In particular, the query manager 1004 can identify, receive, and analyze a query. For example, the query manager 1004 can implement or utilize an image analysis technique to analyze a digital image and determine a product identification from a digital image. Additionally, the query manager 1004 can analyze text to determine a product identification by utilizing a text analysis technique to identify a product name, serial number, product code, or other product identifier. The query manager 1004 can further determine product specifications associated with the identified product. For example, the query manager 1004 can communicate with the storage manager 1018 to access the product database 1020 (e.g., the product database 116 or the product database 328) and identify product specifications that correspond to the product identified from the received query.

As illustrated, the digital response generation system 1002 includes a query classification model manager 1006. In particular, the query classification model manager 1006 can determine, ascertain, identify, classify, or predict a type or classification of a given query. For example, as disclosed herein, the query classification model manager 1006 can communicate with the query manager 1004 to analyze a received query and to classify the received query as one or more of a product query, a conversational query, a recommendation query, or a purchase query.

Additionally, the digital response generation system 1002 includes a conversational model manager 1008. Indeed, as described above, based on classifying a received query as a conversational query, the conversational model manager 1008 can analyze the query to generate, produce, predict, or create relevant words for a response to the query, where the response is conversational in nature.

The digital response generation system 1002 also includes a recommendation and purchase model manager 1010. In particular, the recommendation and purchase model manager 1010 can, based on receiving a query that the query classification model manager 1006 classifies as a recommendation query or a purchase query, analyze the query to generate, produce, predict, or create relevant words for a response to the query, where the response may include a product recommendation, purchase instructions, etc.

As shown, the digital response generation system 1002 further includes a neural ranking model manager 1012. In particular, the neural ranking model manager 1012 can manage, maintain, train, implement, and/or utilize a neural ranking model as described herein. For example, the neural ranking model manager 1012 can communicate with the query manager 1004 to input the received query and the determined product specifications for an identified product into a neural ranking model to generate relevance scores for the product specifications. In addition, the neural ranking model manager 1012 can communicate with the storage manager 1018 to access training data within the product database 1020 to train the neural ranking model in accordance with the processes and methods disclosure.

As also illustrated, the digital response generation system 1002 includes a product specification selector 1014. In particular the product specification selector 1014 can identify, select, generate, or produce a product specification that corresponds to a received query. For example, the product specification selector 1014 can compare the relevance scores for the product specifications to rank the product specifications according to their respective relevance scores. In addition, the product specification selector 1014 can select one or more product specifications (e.g., with a highest relevance score or a relevance score above a threshold score) as product specification(s) that correspond to (e.g., match) the received query.

As further illustrated in FIG. 10, the digital response generation system 1002 includes a response generator 1016. In particular, the response generator 1016 can create, produce, or otherwise generate a response to a received query. For example, the response generator 1016 can generate a response that includes an indication of a selected product specification that matches a received query. The response generator 1016 can communicate with the conversational model manager 1008, the recommendation and purchase model manager 1010, and/or the neural ranking model manager 1012 to generate a response in accordance with the respective model used to analyze a received query. Additionally, the response generator 1016 can generate a response by utilizing a response generation template that provides a framework of phraseology and sentence structure to formulate a response to provide to a client device. Furthermore, the response generator 1016 can provide the generated response to a client device.

In one or more embodiments, each of the components of the digital response generation system 1002 are in communication with one another using any suitable communication technologies. Additionally, the components of the digital response generation system 1002 can be in communication with one or more other devices including one or more client devices described above. It will be recognized that although the components of the digital response generation system 1002 are shown to be separate in FIG. 10, any of the subcomponents may be combined into fewer components, such as into a single component, or divided into more components as may serve a particular implementation. Furthermore, although the components of FIG. 10 are described in connection with the digital response generation system 1002, at least some of the components for performing operations in conjunction with the digital response generation system 1002 described herein may be implemented on other devices within the environment.

The components of the digital response generation system 1002 can include software, hardware, or both. For example, the components of the digital response generation system 1002 can include one or more instructions stored on a computer-readable storage medium and executable by processors of one or more computing devices (e.g., the computing device 1000). When executed by the one or more processors, the computer-executable instructions of the digital response generation system 1002 can cause the computing device 1000 to perform the patch matching methods described herein. Alternatively, the components of the digital response generation system 1002 can comprise hardware, such as a special purpose processing device to perform a certain function or group of functions. Additionally or alternatively, the components of the digital response generation system 1002 can include a combination of computer-executable instructions and hardware.

Furthermore, the components of the digital response generation system 1002 performing the functions described herein may, for example, be implemented as part of a stand-alone application, as a module of an application, as a plug-in for applications including content management applications, as a library function or functions that may be called by other applications, and/or as a cloud-computing model. Thus, the components of the digital response generation system 1002 may be implemented as part of a stand-alone application on a personal computing device or a mobile device. Alternatively or additionally, the components of the digital response generation system 1002 may be implemented in any application that allows creation and delivery of marketing content to users, including, but not limited to, applications in ADOBE CREATIVE CLOUD and/or ADOBE MARKETING CLOUD, such as ADOBE CAMPAIGN, ADOBE ANALYTICS, and ADOBE MEDIA OPTIMIZER. "ADOBE," "CREATIVE CLOUD," "MARKETING CLOUD," "CAMPAIGN," "ANALYTICS," and "MEDIA OPTIMIZER," are registered trademarks of Adobe Systems Incorporated in the United States and/or other countries.

FIGS. 1-10, the corresponding text, and the examples provide a number of different systems, methods, and non-transitory computer readable media for generating and providing product-specific responses to digital queries by utilizing a neural ranking model. In addition to the foregoing, embodiments can also be described in terms of flowcharts comprising acts for accomplishing a particular result. For example, FIG. 11 illustrates a flowchart of an example sequence of acts in accordance with one or more embodiments.

Figure 11:
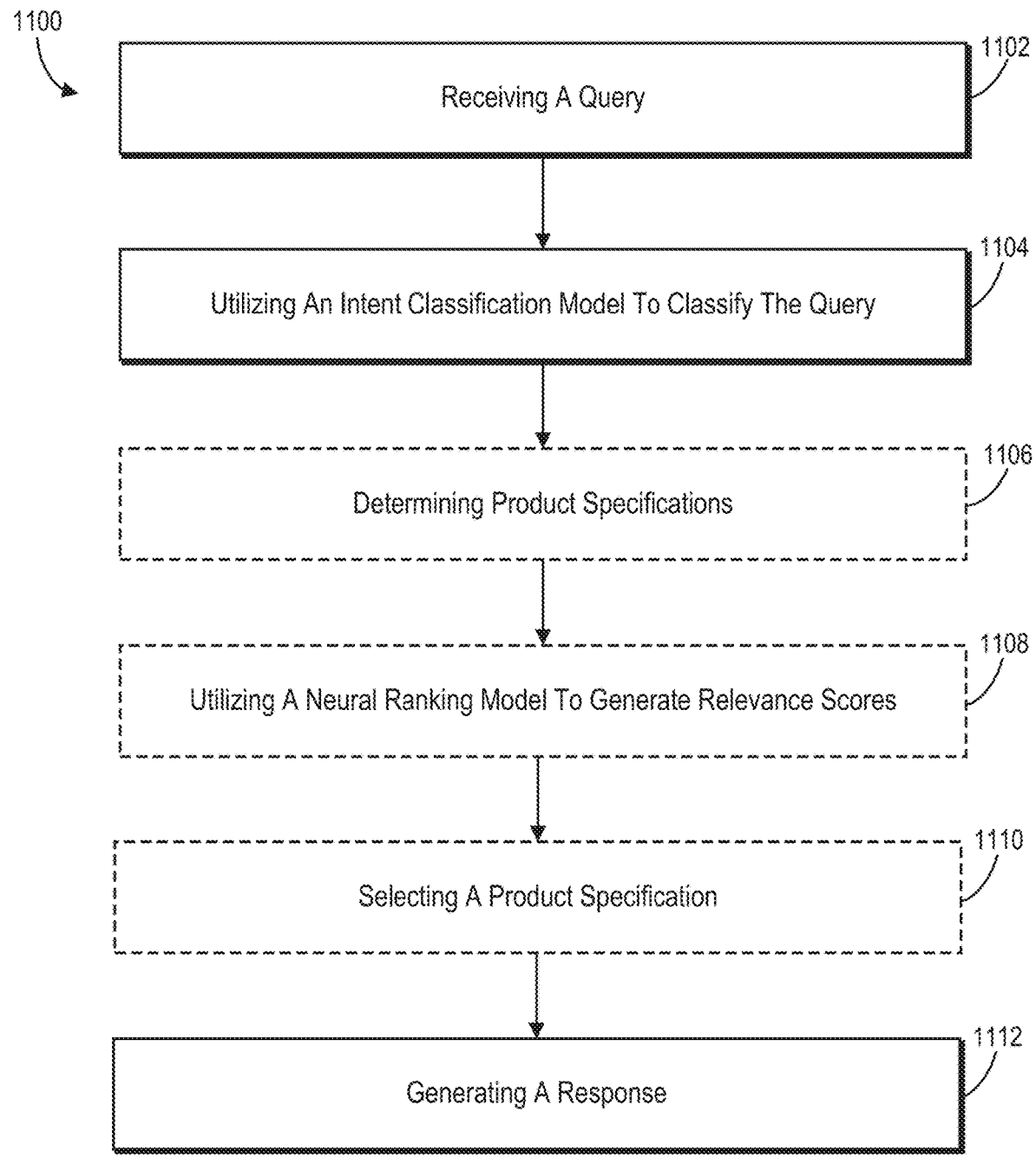
FIG. 11 illustrates a flowchart of a series of acts for generating a response in accordance with one or more embodiments.

While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11. Additionally, the acts described herein may be repeated or performed in parallel with one another or in parallel with different instances of the same or other similar acts.

As shown, the series of acts 1100 further includes an act 1108 of selecting a product specification. In particular, the act 1108 can involve selecting, from among the plurality of product specifications, a product specification corresponding to the received query by comparing each relevance score for each product specification. The act 1108 can further involve identifying, from among the plurality of product specifications, a product specification with a highest relevance score.

As further shown, the series of acts 1100 can include an act 1110 of generating a response. In particular, the act 1110 can involve generating a response to the received query, the response comprising an indication of the product specification corresponding to the received query.

FIG. 11 illustrates a sequence of acts 1100 for generating a response based on a received query. In particular, the sequence of acts 1100 includes an act 1102 of receiving a query. For example, the act 1102 can involve receiving a query from a client device. In addition, the act 1102 can involve receiving, from a client device, a query corresponding to a product. In some embodiments, the received query can include a digital image of the product.

The sequence of acts 1100 further includes an act 1104 of utilizing a query classification model to classify the query. In particular, the act 1104 can involve, in response to receiving the query, utilizing a query classification model to classify the query as a product query.

In addition, the sequence of acts 1100 includes an act 1106 of determining product specifications. In particular, the act 1106 can involve determining, based on classifying the query as a product query, a plurality of product specifications associated with a product indicated by the query. The series of acts 1100 can further include an act of determining the plurality of product specifications associated with the product by analyzing the digital image of the product.

As shown, the sequence of acts 1100 includes an act 1108 of utilizing a neural ranking model to generate relevance scores. In particular, the act 1108 can involve, for each of the plurality of product specifications, utilizing a neural ranking model with a differential product concatenation layer to generate a relevance score with respect to the received query, wherein the neural ranking model is trained based on training queries and training product specifications to determine relevance scores corresponding to queries and product specifications. The act 1108 can further involve utilizing a word representation layer of the neural ranking model to generate a text vector representation of the received query and, for each of the plurality of product specifications, a text vector representation of the product specification.

The act 1108 can still further involve utilizing a bidirectional long short-term memory layer of the neural ranking model to generate a query vector representing the received query based on the text vector representation of the received query and, for each of the plurality of product specifications, a product specification vector representing the product specification based on the text vector representation of the product specification. In addition, the act 1108 can involve utilizing a differential product concatenation layer of the neural ranking model to generate, for each of the plurality of product specifications, a concatenated vector based on the query vector and the product specification vector. The act 1108 can still further involve generating, for each of the plurality of product specifications, a concatenated vector by generating a differential vector based on the query vector and the product specification vector, generating a product vector from the query vector and the product specification vector, and concatenating the differential vector and the product vector.

Furthermore, the act 1108 can involve utilizing a full connection layer and a softmax layer of the neural ranking model to determine, for each of the plurality of product specifications, a probability that the product specification is relevant to the received query.

As further shown, the sequence of acts 1100 includes an act 1110 of selecting a product specification. In particular, the act 1110 can involve selecting, from among the plurality of product specifications, a product specification corresponding to the received query by comparing each relevance score for each product specification. The act 1110 can further involve identifying, from among the plurality of product specifications, a product specification with a highest relevance score.

Additionally, the sequence of acts 1100 includes an act 1112 of generating a response. In particular, the act 1112 can involve generating a response to the received query, the response comprising an indication of the product specification corresponding to the received query.

The series of acts 1100 can further include an act of receiving a second query from the client device, and an act of, in response to receiving the second query, utilizing a query classification model to classify the second query as a conversational query. The series of acts 1100 can also include an act of, based on classifying the second query as a conversational query, utilizing a conversational model to generate a response to the second query.

Similarly, the series of acts 1100 can include acts of receiving a third query from the client device, in response to receiving the third query, utilizing a query classification model to classify the third query as a recommendation query, and, based on classifying the third query as a recommendation query, utilizing a recommendation and purchase model to generate a response to the third query, the response to the third query comprising a product recommendation.

Along similar lines, the series of acts can include acts of receiving a fourth query from the client device, in response to receiving the fourth query, utilizing a query classification model to classify the fourth query as a purchase query, and, based on classifying the fourth query as a purchase query, utilizing a recommendation and purchase model to generate response to the fourth query, the response to the fourth query comprising instructions for purchasing a product indicated by the fourth query.

Although not illustrated in FIG. 11, the digital response generation system 102 can also train a neural ranking model. In particular the series of acts for training a neural ranking model can include an act of identifying a training query. For example, identifying the training query can involve identifying a training query regarding a first product specification of a training product, wherein the training product corresponds to a plurality of training product specifications.

The series of acts for training the neural ranking model can also include an act of training a neural ranking model that includes a bidirectional long short-term memory layer and a differential product concatenation layer by, for each training product specification of the plurality of training product specifications: utilizing the bidirectional long short-term memory layer and the differential product concatenation layer to generate a relevance score and comparing the relevance score to a ground truth score for the training product specification, the ground truth score indicating whether the training product specification is the first product specification of the training query. comparing the relevance score to the ground truth score can include applying a loss function to determine a measure of loss between the relevance score and the ground truth score.

The series of acts for training the neural ranking model can also include an act of utilizing a word representation layer of the neural ranking model to generate a text vector representation of the training query and, for each of the plurality of training product specifications, a text vector representation of the training product specification. Training the neural ranking model can further involve utilizing the bidirectional long short-term memory layer to generate a training query vector representing the training query based on the text vector representation of the training query and, for each of the plurality of training product specifications, a training product specification vector representing the training product specification based on the text vector representation of the training product specification.

In addition, training the neural ranking model can involve utilizing the differential product concatenation layer to generate, for each of the plurality of training product specifications, a training concatenated vector based on the training query vector and the training product specification vector. Training the neural ranking model can further involve utilizing a full connection layer and a softmax layer of the neural ranking model to determine, for each of the plurality of training product specifications, a probability that the training product specification is relevant to the training query. Training the neural ranking model can still further involve modifying parameters of the long short-term memory layer and the full connection layer to reduce the measure of loss between the relevance score and the ground truth score.

Figure 12:
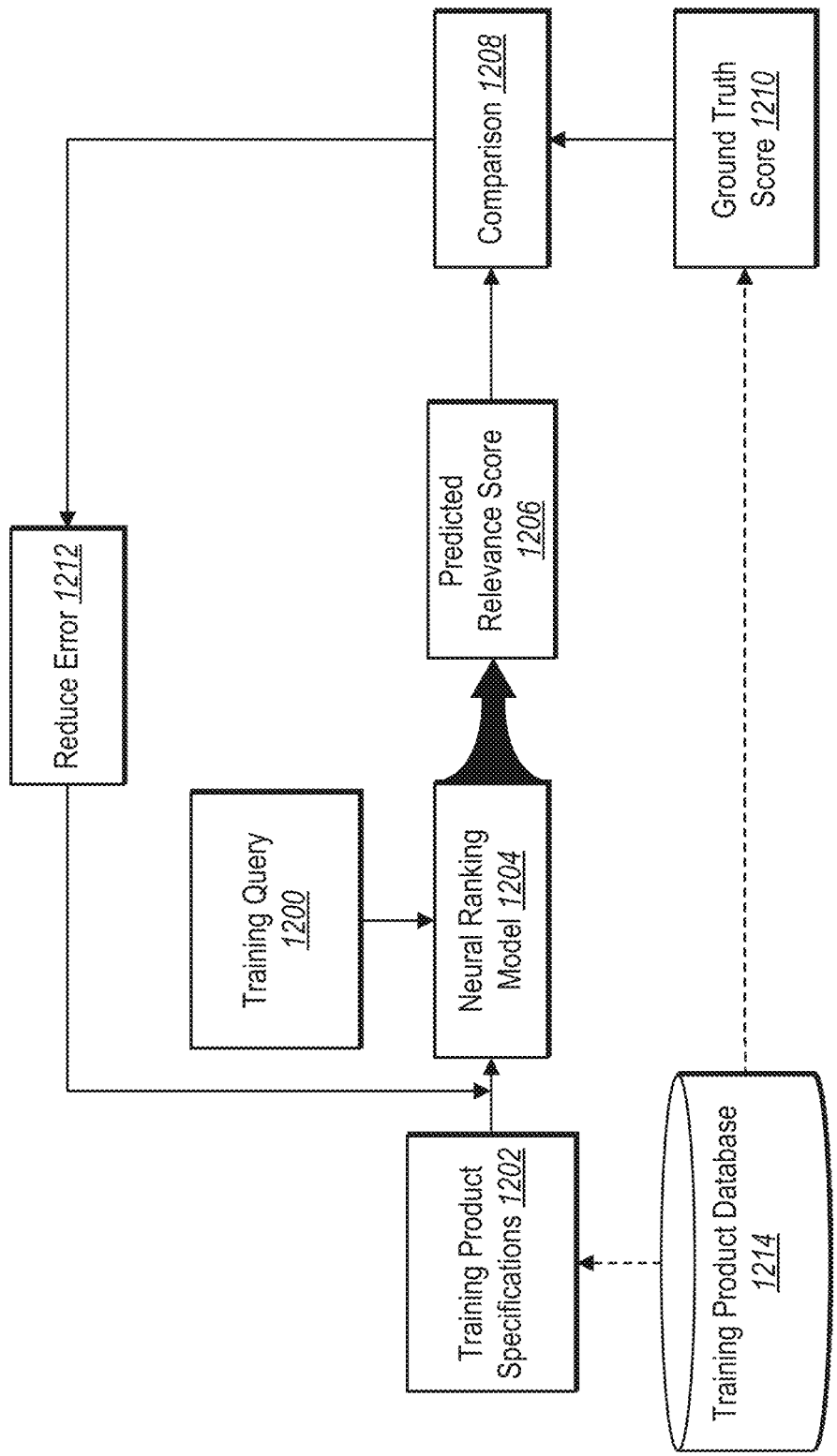
FIG. 12 illustrates a series of acts in a step for training a neural ranking model to determine relevance rankings of product specifications with respect to queries in accordance with one or more embodiments.

As mentioned above, the digital response generation system 102 can train a neural ranking model based on training data. Indeed, FIG. 12 illustrates exemplary acts and algorithms for a step for training a neural ranking model (e.g., with a differential product concatenation layer) to determine relevance rankings of product specifications with respect to queries. The step for training a neural ranking model can include the below description of FIG. 12, in addition to acts and algorithms described elsewhere in this disclosure (e.g., FIGS. 4-5).

As shown in FIG. 12, the step includes identifying a training query 1200. For example, as described above, the digital response generation system 102 utilizes a training query 1200 and training product specifications 1202 as input for a neural ranking model 1204. To illustrate, the digital response generation system 102 accesses the training product specifications 1202 from within a training product database 1214. The digital response generation system 102 feeds the training product specifications 1202 and the training query 1200 into the neural ranking model 1204.

More specifically, as described above, the digital response generation system 102 inputs a first training product specification and the training query 1200 into a word representation layer whereby the digital response generation system 102 generates a training query text vector and a training product specification text vector. The digital response generation system 102 further utilizes a bidirectional long short-term memory layer within the neural ranking model 1204 to generate a training query vector from the training query text vector and to generate a training product specification vector from the training product specification text vector.

Furthermore, the digital response generation system 102 utilizes a differential product concatenation layer within the neural ranking model 1204 to generate a concatenated vector as described herein. Based on the concatenated vector, the digital response generation system 102 implements a full connection layer and a softmax layer to generate a predicted relevance score 1206 that represents a probability that the training product specification corresponds to the training query.

As described above, the digital response generation system 102 performs a comparison 1208 to compare the predicted relevance score 1206 with a ground truth score 1210. Indeed, the digital response generation system 102 accesses the ground truth score 1210 from the training product database 1214 and compares the ground truth score 1210 with the predicted relevance score 1206 by utilizing a loss function to determine a measure of loss (e.g., an error) between the ground truth score 1210 and the predicted relevance score 1206.

As further illustrated in FIG. 12, the digital response generation system 102 performs act 1212 to reduce the error or the measure of loss. The digital response generation system 102 repeats the training process to increase the accuracy of the neural ranking model 1204. For example, the digital response generation system 102 generates a second predicted relevance score for a second training product specification in relation to the training query 1200. Indeed, the digital response generation system 102 generates a relevance score for each product specification that are associated with the product identified within the training query 1200.

Furthermore, upon generating relevance scores for product specifications associated with a first training query 1200, the digital response generation system 102 further trains the neural ranking model 1204 by performing the same process illustrated in FIG. 12 in a relation to other training queries as well. For example, the digital response generation system 102 generates relevance scores for product specifications associated with products identified with each of a number of training queries. By repeating the process of FIG. 12, the digital response generation system 102 trains the neural ranking model 1204 to become more accurate and to correctly match product specifications with queries.

Figure 13:
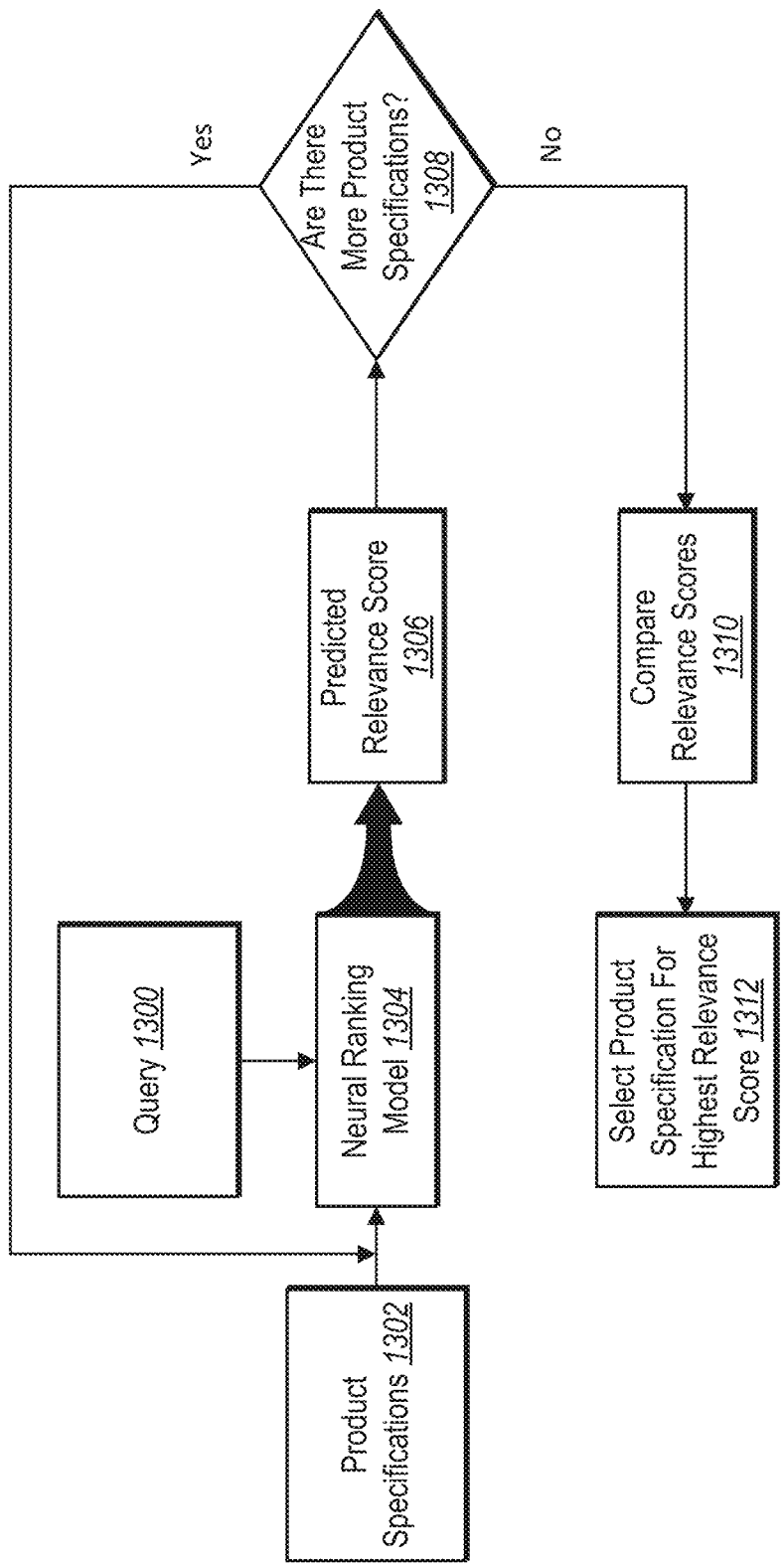
FIG. 13 illustrates a series of acts in a step for utilizing the neural ranking model to select a product specification that corresponds to a query.

As mentioned, the digital response generation system 102 utilizes a trained neural ranking model to select a product specification that corresponds to a received query. Indeed, FIG. 13 illustrates exemplary acts and algorithms for a step for utilizing the neural ranking model (e.g., with the differential product concatenation layer) to select a product specification that corresponds to a query. The step for utilizing a neural ranking model can include the below description of FIG. 13, in addition to acts and algorithms described elsewhere in this disclosure (e.g., FIGS. 4-5).

As illustrated in FIG. 13, the digital response generation system 102 utilizes a received query 1300 and product specifications 1302 that correspond to the received query 1300 as input for the neural ranking model 1304. The digital response generation system 102 utilizes the trained neural ranking model 1304 to generated predicted relevance scores 1306 for the product specifications 1302. Indeed, as described above, the digital response generation system 102 generates a predicted relevance score 1306 for each of the product specifications 1302, where the predicted relevance score 1306 represents a probability that the given product specification matches the query 1300.

Furthermore, the foregoing disclosure includes various acts and algorithms for generating a response to a digital query utilizing language processing models corresponding to a query classification. For example, FIGS. 2, 3, 6, and 9 include disclosure for utilizing a neural ranking algorithm, conversational model, or recommendation/purchase model (i.e., language processing models) specific to a particular query classification to generate a response. Accordingly, the acts and algorithms disclosed in relation to FIGS. 2, 3, 6, and 9 provide exemplary structure for a step for generating a response to a digital query utilizing a language processing model corresponding to a query classification.

As shown, the digital response generation system 102 further performs act 1308 to determine whether there are more product specifications 1302. If the digital response generation system 102 determines that there are more product specifications 1302 associated with the query 1300 and for which the digital response generation system 102 has not yet generated a predicted relevance score 1306, the digital response generation system 102 identifies a new product specification to use as input for the neural ranking model 1304 to generate a predicted relevance score 1306.

On the other hand, if the digital response generation system 102 determines that there are no more product specifications 1302 associated with the query 1300, the digital response generation system performs act 1310 to compare each of the predicted relevance scores. In particular, the digital response generation system 102 ranks each of the product specifications 1302 according to their respective relevance scores. In addition, as set forth in this disclosure, the digital response generation system 102 performs act 1312 to select a product specification that has a highest relevance score as the product specification that corresponds to (e.g., matches) the query 1300.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
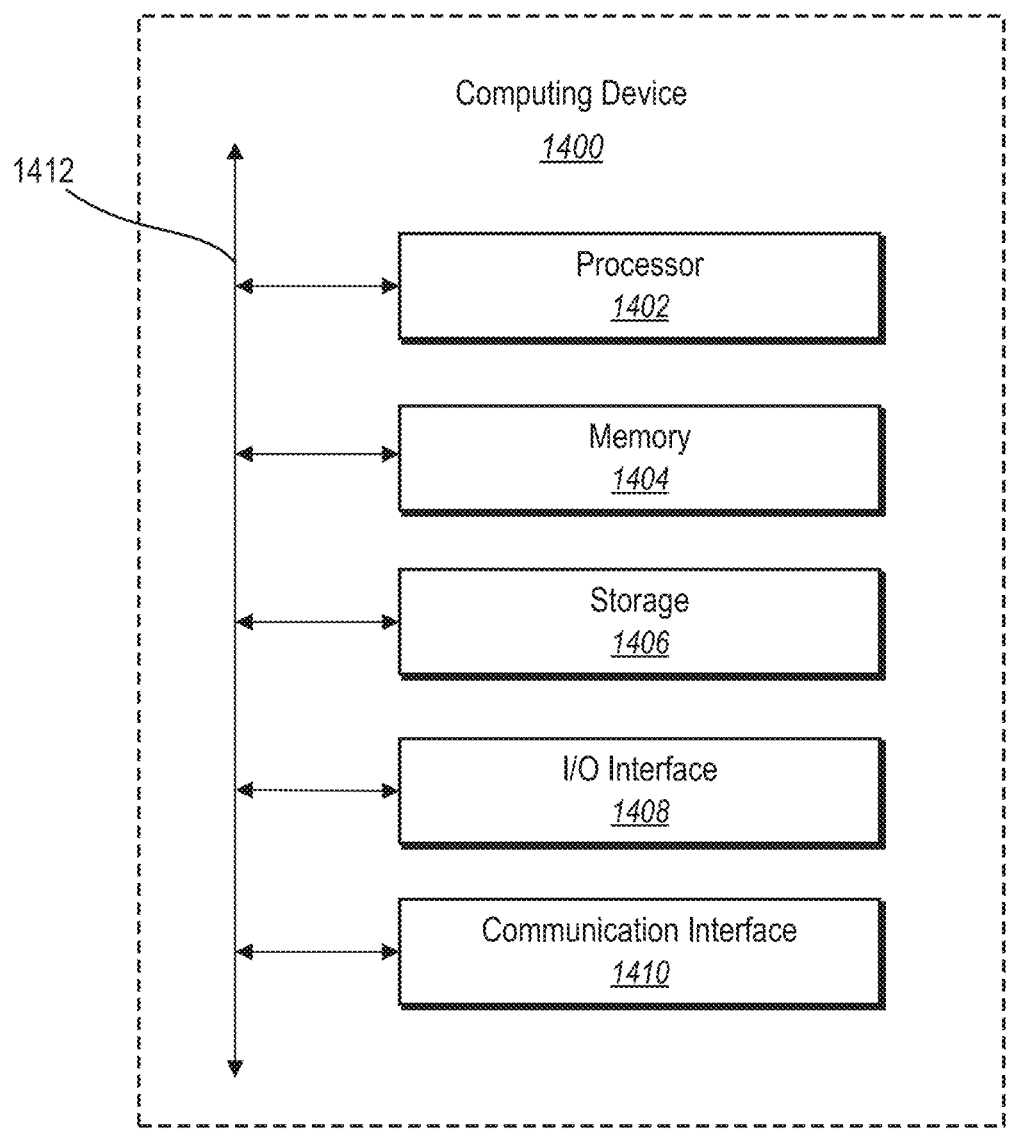
FIG. 14 illustrates a block diagram of an example computing device in accordance with one or more embodiments.

FIG. 14 illustrates, in block diagram form, an example computing device 1400 (e.g., client device 700, computing device 1000, client device 108, and/or server(s) 104) that may be configured to perform one or more of the processes described above. One will appreciate that the digital response generation system 102 can comprise implementations of the computing device 1400. As shown by FIG. 14, the computing device can comprise a processor 1402, memory 1404, a storage device 1406, an I/O interface 1408, and a communication interface 1410. Furthermore, the computing device 1400 can include an input device such as a touchscreen, mouse, keyboard, etc. In certain embodiments, the computing device 1400 can include fewer or more components than those shown in FIG. 14. Components of computing device 1400 shown in FIG. 14 will now be described in additional detail.

In particular embodiments, processor(s) 1402 includes hardware for executing instructions, such as those making up a computer program. As an example, and not by way of limitation, to execute instructions, processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example, and not by way of limitation, storage device 1406 can comprise a non-transitory storage medium described above. The storage device 1406 may include a hard disk drive (HDD), flash memory, a Universal Serial Bus (USB) drive or a combination of these or other storage devices.

The computing device 1400 also includes one or more input or output ("I/O") devices/interfaces 1408, which are provided to allow a user to provide input to (such as user strokes), receive output from, and otherwise transfer data to and from the computing device 1400. These I/O devices/interfaces 1408 may include a mouse, keypad or a keyboard, a touch screen, camera, optical scanner, network interface, modem, other known I/O devices or a combination of such I/O devices/interfaces 1408. The touch screen may be activated with a writing device or a finger.

The I/O devices/interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1408 is configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 can provide one or more interfaces for communication (such as, for example, packet-based communication) between the computing device and one or more other computing devices 1400 or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can comprise hardware, software, or both that couples components of computing device 1400 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:
   at least one processor; and
   a non-transitory computer readable medium comprising instructions that, when executed by the at least one processor, cause the system to:
   identify a training query that corresponds to a first product specification of a training product, wherein the training product corresponds to a plurality of training product specifications;
   train a neural ranking model comprising a bidirectional long short-term memory layer and a differential product concatenation layer to generate relevance scores between product specifications and digital queries by, for each training product specification of the plurality of training product specifications:
   generating a training concatenated vector utilizing the differential product concatenation layer to concatenate a difference vector representing a difference between a training query vector and a training product specification vector together with a product vector representing a product of the training query vector and the training product specification vector;
   generating a relevance score indicating a measure of correspondence between the training product specification and the training query by utilizing the bidirectional long short-term memory layer to process the training concatenated vector; and
   comparing the relevance score to a ground truth score for the training product specification, the ground truth score indicating whether the training product specification is the first product specification that corresponds to the training query.

2. The system of claim 1, further comprising instructions that, when executed by the at least one processor, cause the system to train the neural ranking model by further generating, utilizing a word representation layer of the neural ranking model:
   a training query text vector from the training query; and
   for each of the plurality of training product specifications, a training specification text vector from the training product specification.

3. The system of claim 2, further comprising instructions that, when executed by the at least one processor, cause the system to train the neural ranking model by further generating, utilizing the bidirectional long short-term memory layer:
   a training query vector from the training query text vector and representing the training query; and
   for each of the plurality of training product specifications, a training product specification vector from the training specification text vector and representing the training product specification.

4. The system of claim 3, further comprising instructions that, when executed by the at least one processor, cause the system to train the neural ranking model by further utilizing the differential product concatenation layer to generate, for each of the plurality of training product specifications:
  the difference vector by determining a difference between the training query vector and the training product specification vector; and
  the product vector by determining a product of the training query vector and the training product specification vector.

5. The system of claim 1, further comprising instructions that, when executed by the at least one processor, cause the system to train the neural ranking model by further utilizing a full connection layer and a softmax layer of the neural ranking model to determine, for each of the plurality of training product specifications, a probability that the training product specification is relevant to the training query.

6. The system of claim 1, wherein comparing the relevance score to the ground truth score comprises applying a loss function to determine a measure of loss between the relevance score and the ground truth score.

7. The system of claim 6, further comprising instructions that, when executed by the at least one processor, cause the system to train the neural ranking by modifying parameters of the long short-term memory layer and a full connection layer to reduce the measure of loss between the relevance score and the ground truth score.

* * * * *